United States Patent [19]
Butler, Jr. et al.

[11] Patent Number: 5,647,388
[45] Date of Patent: Jul. 15, 1997

[54] MISTING AND WATERING SYSTEM CONTROLLER WITH LIGHT SENSISTIVE DETECTOR

[75] Inventors: James R. Butler, Jr.; Cynthia M. Butler, both of St. Peters; Robert E. Cobb, St. Charles, all of Mo.

[73] Assignee: Phytotronics, Inc., Earth City, Mo.

[21] Appl. No.: 556,270

[22] Filed: Nov. 13, 1995

[51] Int. Cl.⁶ .................................................. A01G 25/16
[52] U.S. Cl. ..................... 137/1; 137/78.3; 137/624.12; 137/624.2; 239/64; 239/70
[58] Field of Search ................ 137/78.3, 624.12, 137/624.2, 1; 239/64, 70

[56] References Cited

U.S. PATENT DOCUMENTS

| | | | |
|---|---|---|---|
| 3,261,992 | 7/1966 | Cole | 307/117 |
| 4,256,133 | 3/1981 | Coward et al. | 137/78.3 |
| 4,304,989 | 12/1981 | Vos et al. | 137/624.2 |
| 4,333,490 | 6/1982 | Enter, Jr. | 137/78.3 |
| 4,541,563 | 9/1985 | Vetsuhara | 239/64 |
| 4,811,221 | 3/1989 | Sturonun et al. | 137/624.12 |
| 4,993,640 | 2/1991 | Bongh | 137/78.3 |
| 5,207,380 | 5/1993 | Harryma | 137/78.3 |
| 5,464,044 | 11/1995 | Brinkerhoff | 137/78.3 |

OTHER PUBLICATIONS

Carol Sturman; Breakthrough in Digital Valves; Feb. 1994 Machine Design; pp. 37–42.
Gemini & Saturn–Phytotronics New Generation of Misting and Watering Controllers; Phytotronics product literature; 1993.
Gemini Misting Controllers; Hummert International 1995/1996 Catalog; p. 188.
Saturn Watering Controllers; Hummert International 1995/1996 Catalog; p. 189.
Gemini Series of Misting Controllers; Hummert International 1993 Catalog; p. 174.
Saturn Series of Irrigation Controllers; Hummert International 1993 Catalog; p. 175.

*Primary Examiner*—A. Michael Chambers
*Attorney, Agent, or Firm*—Senniger, Powers, Leavitt & Roedel

[57] ABSTRACT

System and method for supplying water to plants. A photodetector detects light adjacent the plants and a threshold circuit generates a first signal representative of a first state when the level of illumination of the detected light is less than a threshold level and generates a second signal representative of a second state when the level of illumination of the detected light is greater than the threshold level. A processor is responsive to the first and second signals for anticipating approximately when the detected light will next change from the first state to the second state and approximately when the detected light will next change from the second state to the first state. A counter circuit responsive to the processor generates an initiate signal and a terminate signal. The counter circuit generates the initiate signal a first period of time before or after the anticipated change from the first state to the second state and generates the terminate signal a second period of time before or after the anticipated change from the second state to the first state. A valve control circuit, responsive to the initiate signal for beginning a sequence of alternating on and off periods and responsive to the terminate signal for ending the sequence, controls a valve arrangement which supplies water to the plants.

20 Claims, 19 Drawing Sheets

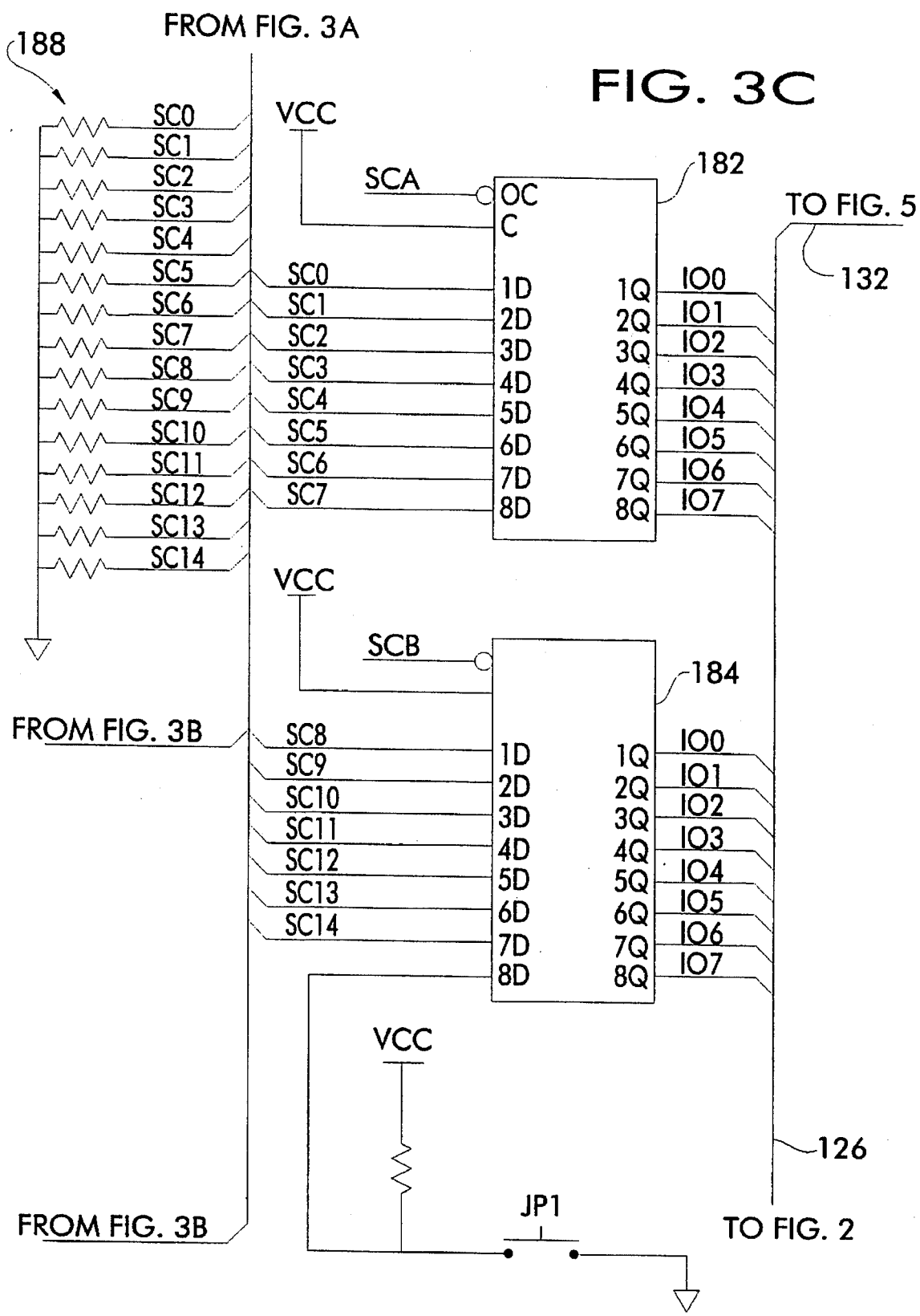

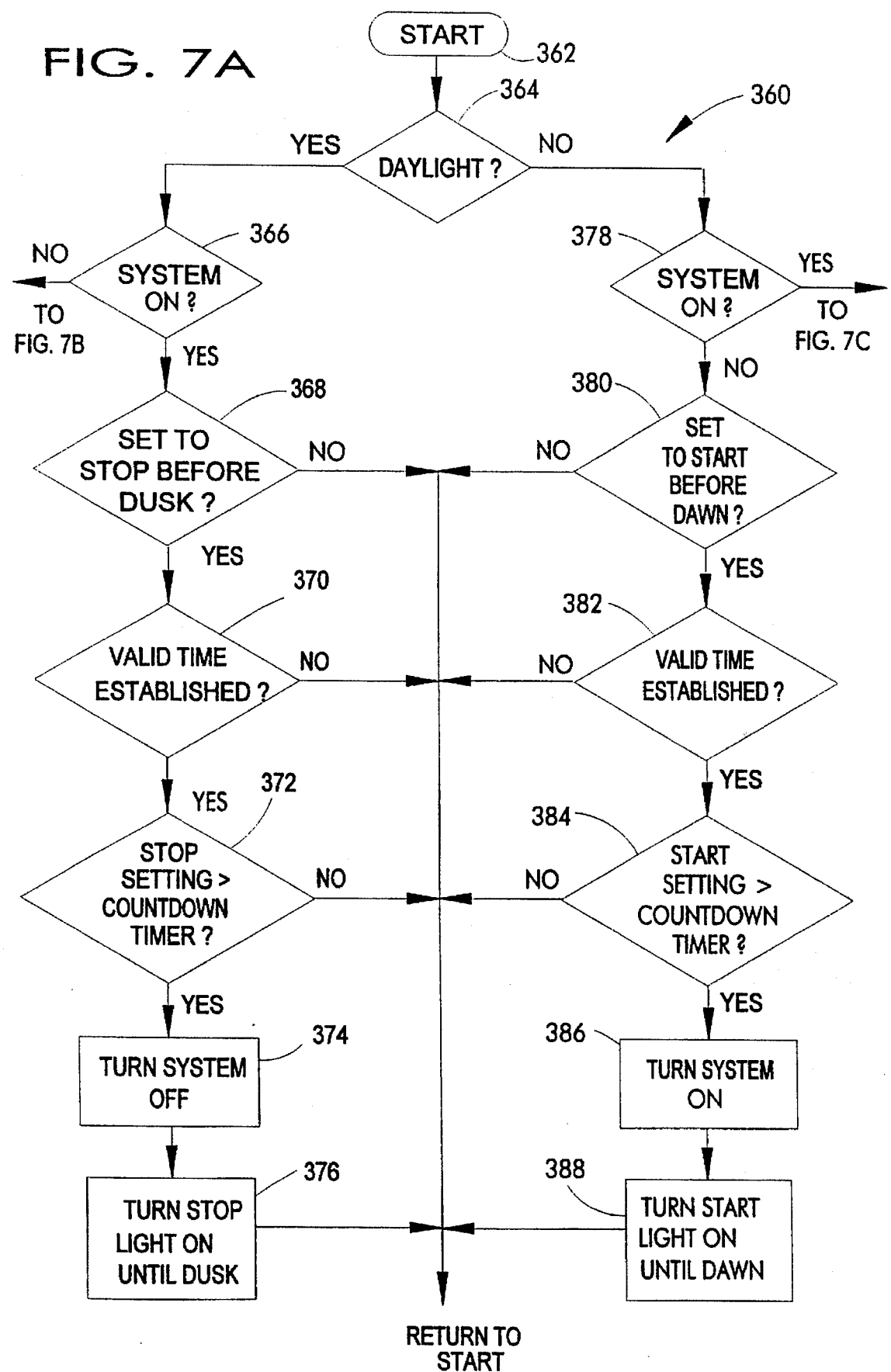

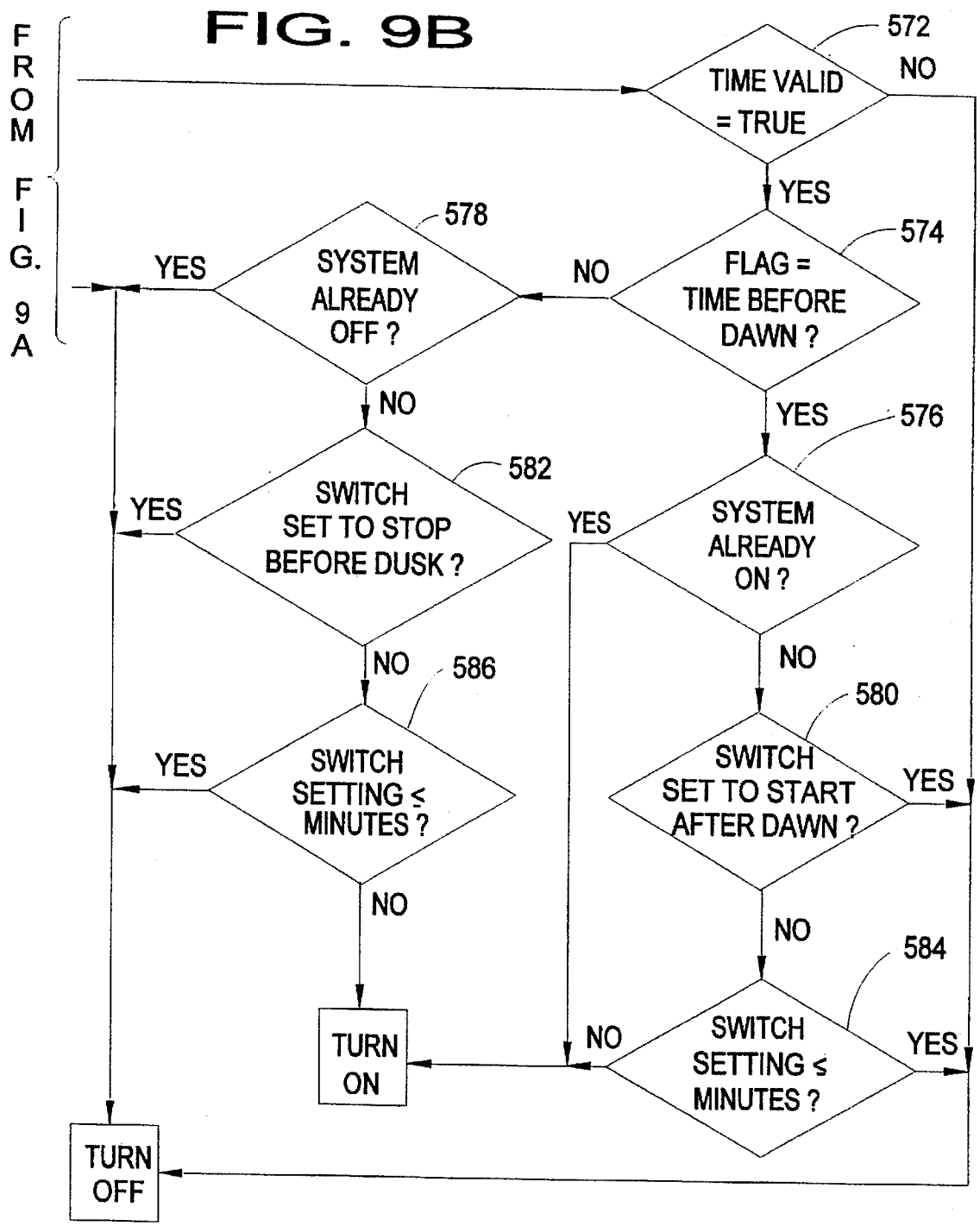

MISTING AND WATERING SYSTEM CONTROLLER WITH LIGHT SENSISTIVE DETECTOR

BACKGROUND OF THE INVENTION

The invention generally relates to misting and watering system controllers and, in particular, to a controller having a light sensitive detector for turning on the misting and watering system before, at or after dawn and for turning off the misting and watering system before, at or after dusk.

Misting or watering system controllers are used in the horticultural industry to control the application of water to plants, including the application of a fine mist to delicate plants such as root plant cuttings. Since such plants are often delicate and subject to over or under watering, accurate watering control is desired. Further, since the amount of light on the plants affects the amount of water that actually reaches the roots of the plants, a system is needed that provides accurate watering control with respect to sunrise and sunset.

Presently, system controllers are available that have a photodetector for detecting light and that determine a time corresponding to when the sun rose in the morning and when the sun set in the evening based on the detected light. In turn, the controllers selectively start a misting or watering sequence at some time after sunrise and selectively stop the sequence at some time after sunset.

Often, however, a misting or watering sequence beginning before sunrise and/or ending before sunset is desired. For this reason, there is a need for a controller which is capable of selectively starting misting or watering operation in a plurality of zones a period of time before, at or after sunrise and selectively stopping the misting or watering operation a period of time before, at or after sunset. As such, a system controller which is able to accurately and reliably predict the next sunrise and the next sunset is needed.

Further, the available controllers that include a photodetector are often subject to errors associated with transitory occurrences. As an example, clouds passing overhead or objects covering the photodetector may cause a false indication of sunset. Similarly, light from transitory sources such as lightning may cause a false indication of sunrise. Therefore, a controller is needed which provides validation of detected transitions from day to night and from night to day.

SUMMARY OF THE INVENTION

Among the objects of the invention are to provide an improved misting and watering system controller which overcomes disadvantageous conditions such as described above; to provide such a system controller which permits accurate watering control; to provide such a system controller which permits anticipating sunrise and permits anticipating sunset; to provide such a system controller which permits beginning a misting or watering sequence before the anticipated sunrise; to provide such a system controller which permits ending the misting or watering sequence before the anticipated sunset; to provide such a system controller which detects transitions from night to day and from day to night; to provide such a system controller which validates the detected transitions; and to provide such a system controller which is electrically efficient, reliable, economical and convenient to use.

Briefly described, a system embodying aspects of the present invention for supplying water to plants includes a photodetector for detecting light adjacent the plants wherein the detected light has at least two levels of illumination corresponding to different states. The system also includes a threshold circuit for generating a first signal representative of a first state when the level of illumination of the detected light is less than a threshold level and for generating a second signal representative of a second state when the level of illumination of the detected light is greater than the threshold level. A processor is responsive to the first and second signals for anticipating approximately when the detected light will next change from the first state to the second state and approximately when the detected light will next change from the second state to the first state. The system further includes a counter circuit responsive to the processor for generating an initiate signal and a terminate signal. The counter circuit generates the initiate signal a first period of time before or after the anticipated change from the first state to the second state and generates the terminate signal a second period of time before or after the anticipated change from the second state to the first state. The system also includes a valve arrangement for supplying water to the plants in a sequence of alternating on and off periods and a valve control circuit responsive to the initiate signal to begin the sequence and responsive to the terminate signal to end the sequence.

Generally, another form of the invention is a method of supplying water to plants including the step of detecting light adjacent the plants wherein the detected light has at least two levels of illumination corresponding to different states. The method also includes generating a first signal representative of a first state when the level of illumination of the detected light is less than a threshold level and generating a second signal representative of a second state when the level of illumination of the detected light is greater than the threshold level. The method further includes the step of anticipating in response to the first and second signals approximately when the detected light will next change from the first state to the second state and approximately when the detected light will next change from the second state to the first state. The method also includes generating an initiate signal and a terminate signal. The initiate signal is generated a first period of time before or after the anticipated change from the first state to the second state and the terminate signal is generated a second period of time before or after the anticipated change from the second state to the first state. The method further includes supplying water to the plants in a sequence of alternating on and off periods responsive to the initiate signal to begin the sequence and responsive to the terminate signal to end the sequence.

Other objects and features will be in part apparent and in part pointed out hereinafter.

BRIEF DESCRIPTION OF THE DRAWINGS

FIGS. 3A, 3B and 3C are a schematic diagram of a control switch circuit of the control circuitry of FIG. 1.

FIGS. 7A, 7B and 7C are a flow diagram illustrating further operation of the processor of FIG. 2 according to the embodiment of FIGS. 6A–6E.

FIGS. 9A and 9B are a flow diagram illustrating further operation of the processor of FIG. 2 according to the embodiment of FIGS. 8A–8C.

Corresponding reference characters indicate corresponding parts throughout the drawings.

DETAILED DESCRIPTION OF PREFERRED EMBODIMENTS

Figure 1:
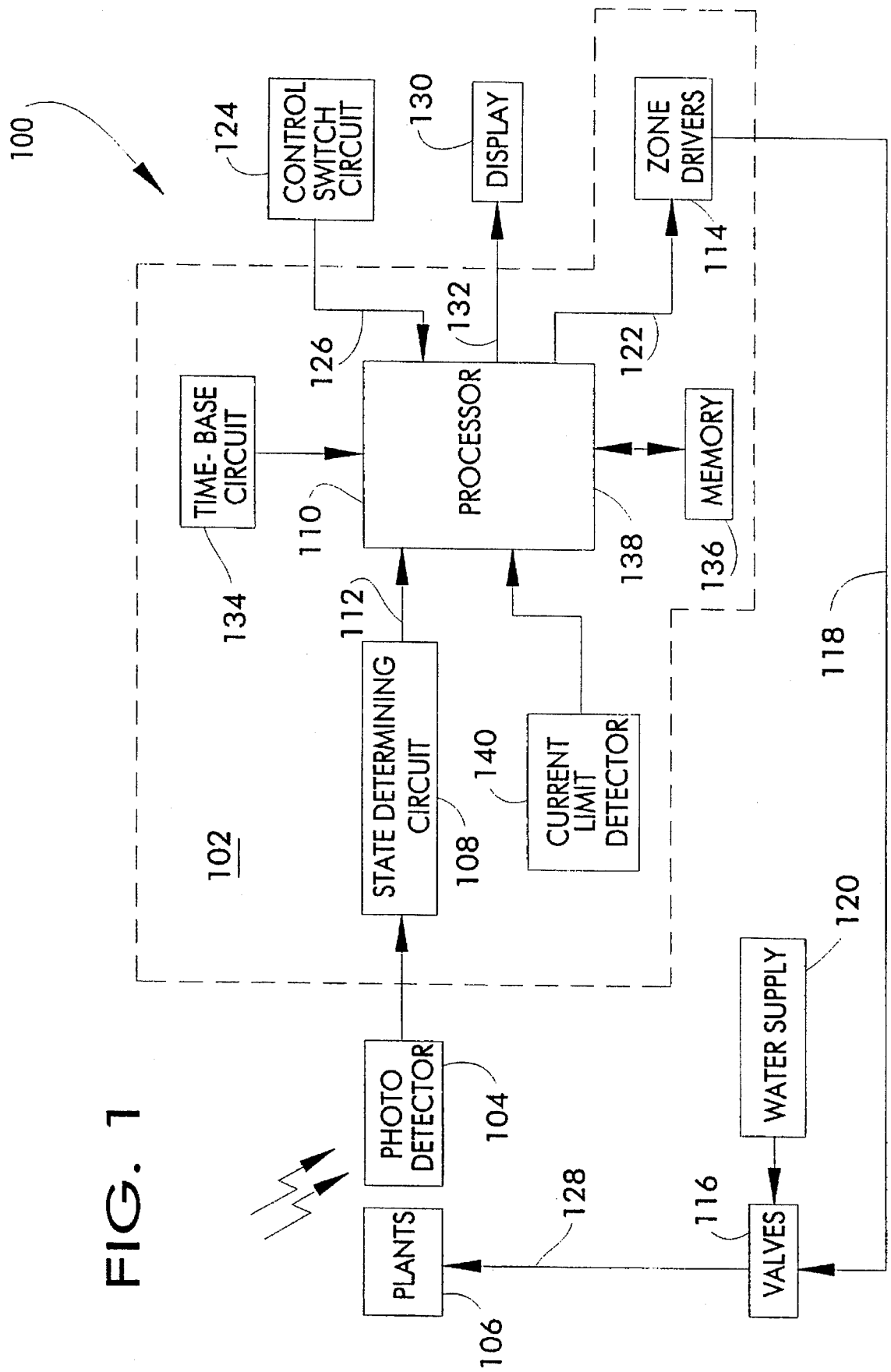
FIG. 1 is a block diagram of a misting and/or watering system including control circuitry according to a preferred embodiment of the invention.

Referring now to FIG. 1, one preferred embodiment of a misting and/or watering system 100 is shown, including a control circuit 102. According to the present invention, the control circuit 102 uses a photodetector circuit 104 to obtain information regarding sunrise and sunset for anticipating, or predicting, the next sunrise or sunset. In general, the control circuit 102 is responsive to the information provided by the photodetector 104 for controlling the system 100.

In a preferred embodiment, photodetector 104 detects light adjacent a bed of plants, such as seedlings or root cuttings, indicated by reference character 106. For convenience, the plants 106 may be arranged in a plurality of watering zones. The light detected by photodetector 104 has at least two levels of illumination corresponding to different states. According to the invention, control circuit 102 includes a threshold circuit 108 that generates a first signal representative of a first state when the level of illumination of the detected light is less than a threshold level and generates a second signal representative of a second state when the level of illumination of the detected light is greater than the threshold level. In this instance, the threshold level corresponds to a level of illumination within an approximate range of 35 to 150 footcandles, which is an estimate of the level of illumination expected at either dawn or dusk. Thus, the first state generally corresponds to night (i.e., the hours of darkness between sunrise and sunset) and the second state generally corresponds to day (i.e., the hours of daylight between sunset and sunrise).

A processor 110 of control circuit 102 receives the first and second signals generated by the threshold circuit 108 via line 112. The processor 110 then anticipates approximately when the detected light will next change from the first state to the second state, and vice-versa, based on the first and second signals. In general, processor 110 determines anticipated state changes as a function of the time-in-state of previous first or second states. In the alternative, processor 110 records the time the detected light previously changed states for determining the anticipated state changes.

As described above, control circuit 102 is responsive to the information provided by photodetector 104 for controlling system 100 according to a desired watering or misting scheme. In a preferred embodiment of the present invention, processor 110 constitutes a counter circuit for generating an initiate signal to begin a sequence of alternating on and off periods and for generating a terminate signal to end the sequence. As shown in FIG. 1, system 100 includes a valve control circuit, embodied as a plurality of zone drivers 114, for controlling a plurality of valves 116 via line 118. In turn, the valves 116 fluidly connect a water supply 120 to the watering zones in which plants 106 are located in accordance with the desired misting or watering sequence. The zone drivers 114 begin the misting or watering sequence in response to the initiate signal via line 122 from processor 110 by causing valves 116 to selectively open and close. The terminate signal via line 122 from processor 110 disables zone drivers 114 to end the sequence. Preferably, each zone driver 114 drives one corresponding valve 116 according to the desired misting or watering sequence. Although the desired watering or misting sequence preferably consists of a number of alternating on and off periods, it is to be understood that it may be only a single on period followed by a single off period.

The counter circuit of processor 110 preferably generates the initiate signal a first period of time before or after the anticipated change from the first state to the second state and generates the terminate signal a second period of time before or after the anticipated change from the second state to the first state. Further to the invention, the first and second periods of time may be zero so that processor 110 generates the initiate and/or terminate signals at the time of the anticipated changes. Processor 110 is responsive to a control switch circuit 124 for preselecting when the initiate and terminate signals are to occur. Preferably, the control switch circuit 124 comprises a plurality of control switches which an operator uses to preselect the first and second periods of time. In addition to preselecting the time periods, the operator uses control switch circuit 124 to instruct processor 110 whether the initiate signal is desired before, at or after dawn and whether the terminate signal is desired before, at or after dusk. As shown in FIG. 1, control switch circuit 124 communicates with processor 110 via line 126.

It is to be understood, however, that in an alternative embodiment, an override circuit resident in processor 110 provides for bypassing operation of photodetector 104 whereby the counter circuit of processor 110 generates the initiate signal at a first desired time and generates the terminate signal at a second desired time.

As described above, plants 106 may be arranged in a plurality of watering zones for convenience. For example, system 100 is operable in six zones with one valve 116 corresponding to each watering zone. Although shown as a single line, line 128 may represent, for example, a hose and sprinkler head corresponding to each valve 116 for delivering water from the water supply 120 in the form of a fine mist or spray to the respective watering zone.

In one preferred embodiment of the invention, processor 110 of control circuit 102 also communicates with a display 130 via line 132. The display 130 is responsive to processor 110 for displaying the status of each of the zones with respect to the desired misting or watering sequence.

Referring further to FIG. 1, processor 110 preferably includes a state circuit for detecting state changes. In a preferred embodiment, processor 110 constitutes the state circuit. In general, the state circuit of processor 110 detects a change from the first state to the second state in response to the first and second signals, respectively, and detects a change from the second state to the first state in response to the second and first signals, respectively. A timer resident in processor 110 times a first interval corresponding to the duration of the first state and times a second interval corresponding to the duration of the second state. In this instance, the timer of processor 110 incrementally counts the first interval in response to the first signal until the second signal indicates that a transition from the first state to the second state has occurred. Likewise, the timer incrementally counts the second interval in response to the second signal until the first signal indicates that a transition from the second state to the first state has occurred.

Processor 110 also includes a validation circuit for validating the detected state changes. According to a preferred embodiment of the invention, processor 110 constitutes the validation circuit. The validation circuit of processor 110 only allows the state circuit of processor 110 to detect the change from the second state to the first state after the first signal indicates that the level of illumination of the detected light is less than the threshold level for longer than a first validation period, such as four minutes. Likewise, the validation circuit only allows the state circuit to detect the change from the first state to the second state after the second signal indicates that the level of illumination of the detected light is greater than the threshold level for longer than a second validation period, such as four minutes. In this manner, processor 110 detects a change in the signals provided by threshold circuit 108 and delays for the validation period before considering the change to be indicative of a valid transition from the first state to the second state, or vice-versa. By delaying in this manner, control circuit 102 prevents errors caused by transitory occurrences (e.g., clouds passing overhead during the day or a light source causing light to strike photodetector 104 during the night) from affecting the control of system 100.

As an added step in preventing false indications of state changes, the validation circuit of processor 110 sums of the first and second timed intervals corresponding to the most recent first and second states and determines if the sum is within a predetermined range of time. As an example, a detected change from the first state to the second state is considered invalid if the sum of the first interval (ending with the detected change) and the preceding second interval is outside the range of 23 to 25 hours. Since the first state preferably corresponds to night and the second state preferably corresponds to day, it is expected that the sum of the most recent consecutive first and second timed intervals is approximately 24 hours. According to the invention, control circuit 102 includes a time-base circuit 134 based on a 24-hour cycle so that the anticipated change from the first state to the second state is approximately 24 hours after a previous change from the first state to the second state and the anticipated change from the second state to the first state is approximately 24 hours after a previous change from the second state to the first state. In the alternative, the time-base circuit 134 is resident in processor 110.

However, in the event that a valid transition is not present within the validation criteria, processor 110 is able to generate the initiate and terminate signals assuming cloud cover, false light, or some other invalid transition so that the misting or watering sequence is not interrupted.

Referring further to FIG. 1, processor 110 anticipates the next change from the first state to the second state based on the first interval timed during at least one previous first state. Assuming that the most recent transition from the first state to the second state detected by processor 110 has been validated, a memory 136 stores the first timed interval. Preferably, memory 136 and processor 110 communicate via line 138. In one preferred embodiment, processor 110 repeatedly averages the first timed intervals after each validated change from the first state to the second state and stores this running average in the memory 136. Processor 110 then determines an anticipated change from the first state to the second state as a function of the stored running average. It is to be understood that processor 110 may constitute memory 136 and that a separate memory is optional.

In a similar manner, processor 110 anticipates the next change from the second state to the first state based on the second interval timed during at least one previous second state. Assuming that the most recent transition from the second state to the first state detected by processor 110 has been validated, memory 136 stores the second timed interval. Processor 110 then determines an anticipated change from the second state to the first state as a function of the running average of the second timed intervals stored in memory 136.

In an alternative embodiment, memory 136 stores the first and second timed intervals corresponding to a predetermined number of validated previous first and second states, respectively, and determines the anticipated state changes as a function of the average of the stored intervals.

As an example, processor 110 determines the anticipated change from the first state to the second state as a function of the average of the stored first timed intervals and determines the anticipated change from the second state to the first state as a function of the average of the stored second timed intervals. In a preferred embodiment, processor 110 determines the anticipated changes as a function of a weighted average according to the equation:

$$T_{new\ average} = (1/4)T_0 + (3/4)T_{old\ average}$$

where $T_{new\ average}$ is the estimated interval until the next state change and $T_{old\ average} = (1/4)T_{-1} + (3/4)(1/4)(T_{-4} + T_{-3} + T_{-2} + T_{-1})$ for four samples. When anticipating the next change from the first state to the second state, $T_0$ is the stored first timed interval corresponding to the most recent previous first state and $T_{-4}, T_{-3}, T_{-2}$ and $T_{-1}$ are the stored first timed intervals corresponding to the four previous first states before $T_0$; when anticipating the next change from the second state to the first state, $T_0$ is the stored second timed interval corresponding to the most recent previous second state and $T_{-4}, T_{-3}, T_{-2}$ and $T_{-1}$ are the stored second timed intervals corresponding to the four previous second states before $T_0$.

In this manner, processor 110 anticipates the next state change by determining an interval of time after which the next state change will occur. As an example, if the watering sequence is desired to begin three hours before sunrise, processor 110 determines an interval as described above following the most recent valid change from the first state to the second state. Following the next change from the second state to the first state, processor 110 subtracts three hours from the determined interval and counts down the difference to generate the initiate signal three hours before the next anticipated change from the first state to the second state.

As described above, zone drivers 114 are responsive to the initiate and terminate signals for causing system 100 to provide water to the watering zones in a desired sequence by selectively opening and closing valves 116. FIG. 1 further illustrates a current limit detector 140 for providing overcurrent protection for each of zone drivers 114 and valves 116. The current limit detector 140 senses the current flowing to the output (i.e., the current in line 118) and limits it to, for example, 2 A(rms). Preferably, current limit detector 140 detects overcurrent conditions with respect to either the current in one of zone drivers 114 or the sum of the currents in all of zone drivers 114.

FIGS. 2–5 show control circuit 102 of FIG. 1 in schematic diagram form according to one preferred embodiment of the present invention.

Figure 2:
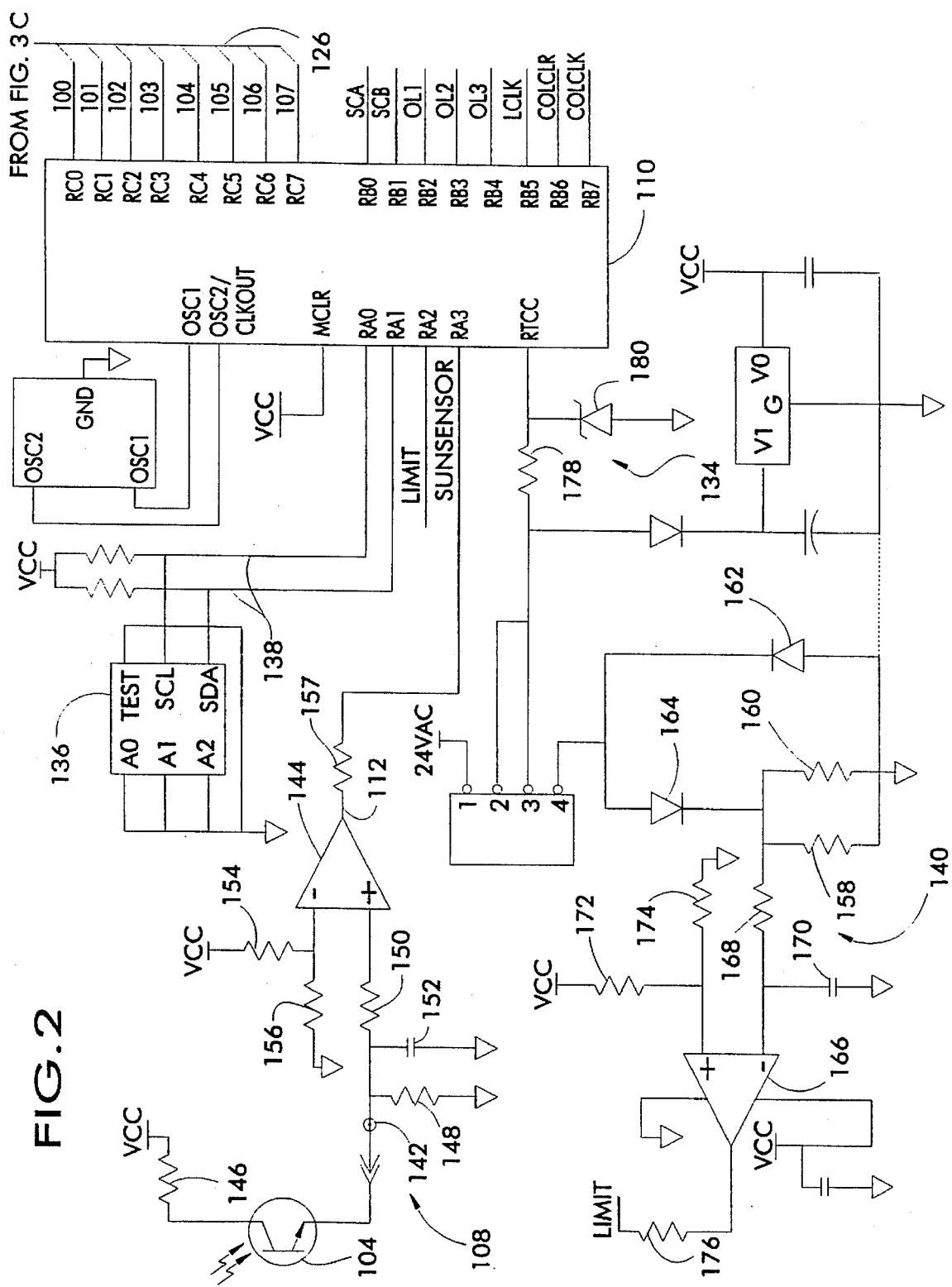
FIG. 2 is a schematic diagram of a processor, a photodetector circuit and a current limiting circuit of the control circuitry of FIG. 1.

As shown in FIG. 2, processor 110 is preferably embodied as an eight bit, one time programmable microcontroller (e.g., model PIC16C57-XT/P microcontroller manufactured by Microchip). As such, processor 110 includes three ports and 20 input/output pins, at least 72 bytes of RAM, at least 2 kilobytes of program memory (ROM) and a real time clock counter (RTCC).

In one embodiment, processor 110 must detect at least two state changes following initial power-up of system 100, or in the case of a power failure, before anticipating the next change. This is because information regarding the previous first and second states is not present in memory 136. In the alternative, memory 136 is a serial EEPROM having 128 bytes of non-volatile memory. In this alternative embodiment, immediately after system 100 is powered up, all 24 VAC outputs from zone drivers 114 are turned off and processor 110 checks the sum of the first and second timed intervals stored in non-volatile memory 136. If the sum of the stored intervals corresponding to the most recent consecutive previous first and second states is outside a desired range of time, such as 23 to 25 hours, processor 110 clears non-volatile memory 136. After clearing non-volatile memory 136, processor 110, in combination with photodetector 104 and threshold circuit 108, determines whether the detected light is in the first state or the second state by sensing the first or second signal for a period of time, such as one minute.

Referring further to FIG. 2, photodetector 104 is embodied as a photo-Darlington transistor providing a signal representative of the level of illumination of the detected light. Preferably, a coaxial cable terminated with a BNC connector connects photodetector 104 to threshold circuit 108 via a BNC jack 142 mounted on the printed circuit board. In the illustrated embodiment, threshold circuit 108 comprises an operational amplifier 144 configured as a comparator for comparing the level of illumination signal to the threshold level. A resistor-capacitor network, comprised of resistors 146, 148, 150 and a capacitor 152, conditions the signal provided by photodetector 104 and a pair of resistors 154, 156 determine the threshold level. In turn, threshold circuit 108 provides a signal, SUNSENSOR, to processor 110 via line 112. Threshold circuit 108 further includes a resistor 157 for limiting the current to processor 110.

According to the invention, the SUNSENSOR signal is representative of whether the level of illumination of the light detected by photodetector 104 is less than or greater than the threshold level and, thus, representative of either day or night. According to the invention, the first state (i.e., night) is represented by the first signal which is logic level low and applied to port RA3 of processor 110. Similarly, the second state (i.e., day) is represented by the second signal which is logic level high and also applied to port RA3 of processor 110.

As shown in FIG. 2, time-base circuit 134 is essentially a 60 Hz, 24 VAC time-base signal input to processor 110 via a real-time-counter input, RTCC. The time-base signal is dropped across a resistor 178, clamped at 5.1 V by a diode 180 and then routed to the RTCC input on processor 110. As such, time-base circuit 134 provides processor 110 with a measure of real time and processor 110 maintains the 24-hour time-base dependent on the 60 Hz signal.

FIG. 2 also shows current limit detector 140 in schematic form. Preferably, current limit detector 140 includes a pair of current sensing resistors 158, 160 and a pair of steering diodes 162, 164. An operational amplifier 166 configured as a comparator is then used to compare the sensed current to a current limit. A resistor-capacitor network comprised of a resistor 168 and a capacitor 170 condition the sensed current signal input to the operational amplifier 166 and a pair of resistors 172, 174 determine the current limit. Current limit detector 140 also includes a resistor 176 for limiting the current to processor 110.

As described above, current limit detector 140 senses the current flowing to the output (i.e., the current in line 118) and limits it to a maximum current level, such as 2 A(rms). Preferably, current limit detector 140 detects overcurrent conditions with respect to either the current in one of zone drivers 114 or the sum of the currents in all of zone drivers 114. In one preferred embodiment, current limit detector 140 flags an overcurrent condition to processor 110 when a logic level low pulse is present at port RA2 for at least two milliseconds. In the event of an overcurrent condition, processor 110 turns off zone drivers 114 and resets control circuit 102.

Figure 3A:
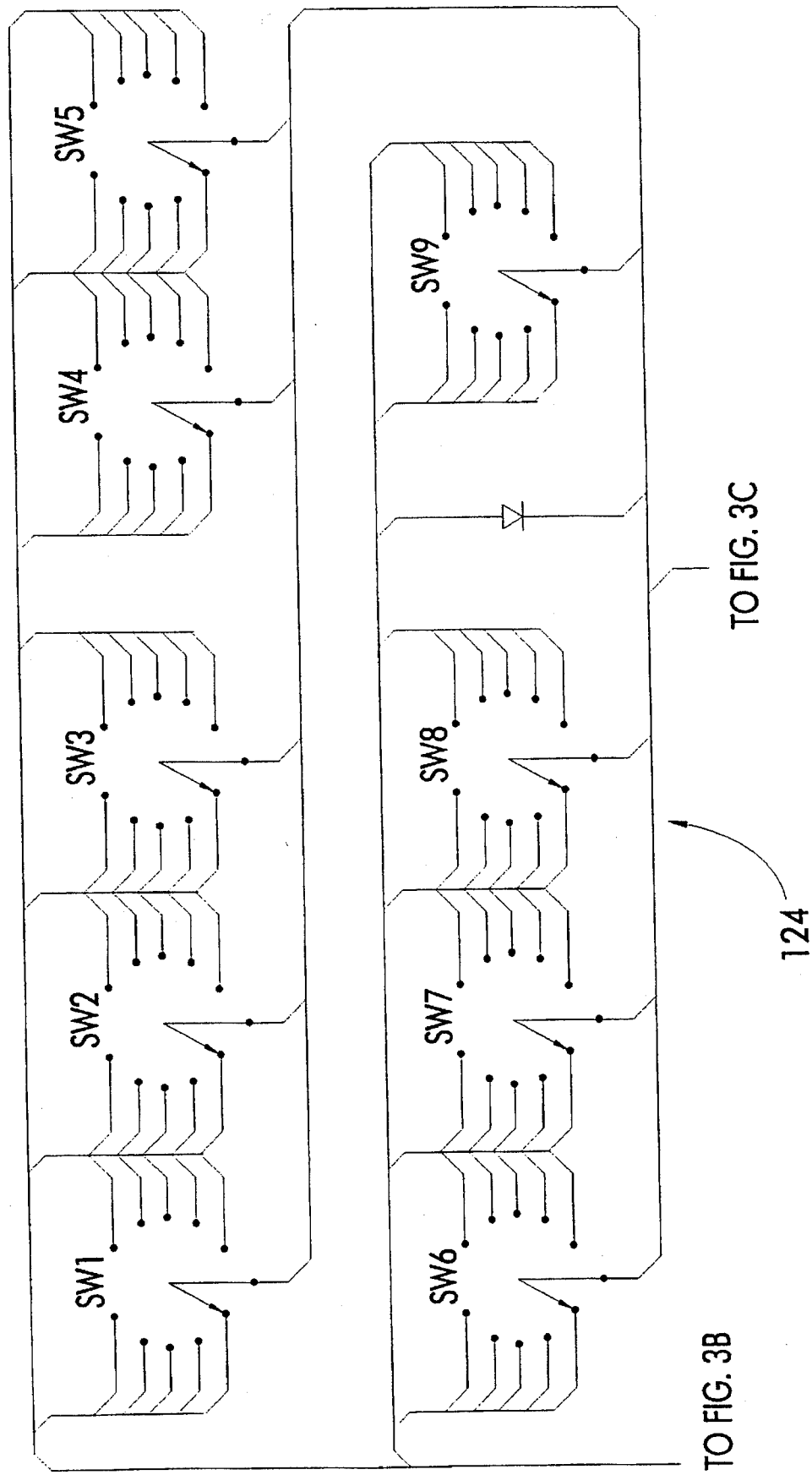
Figure 3B:
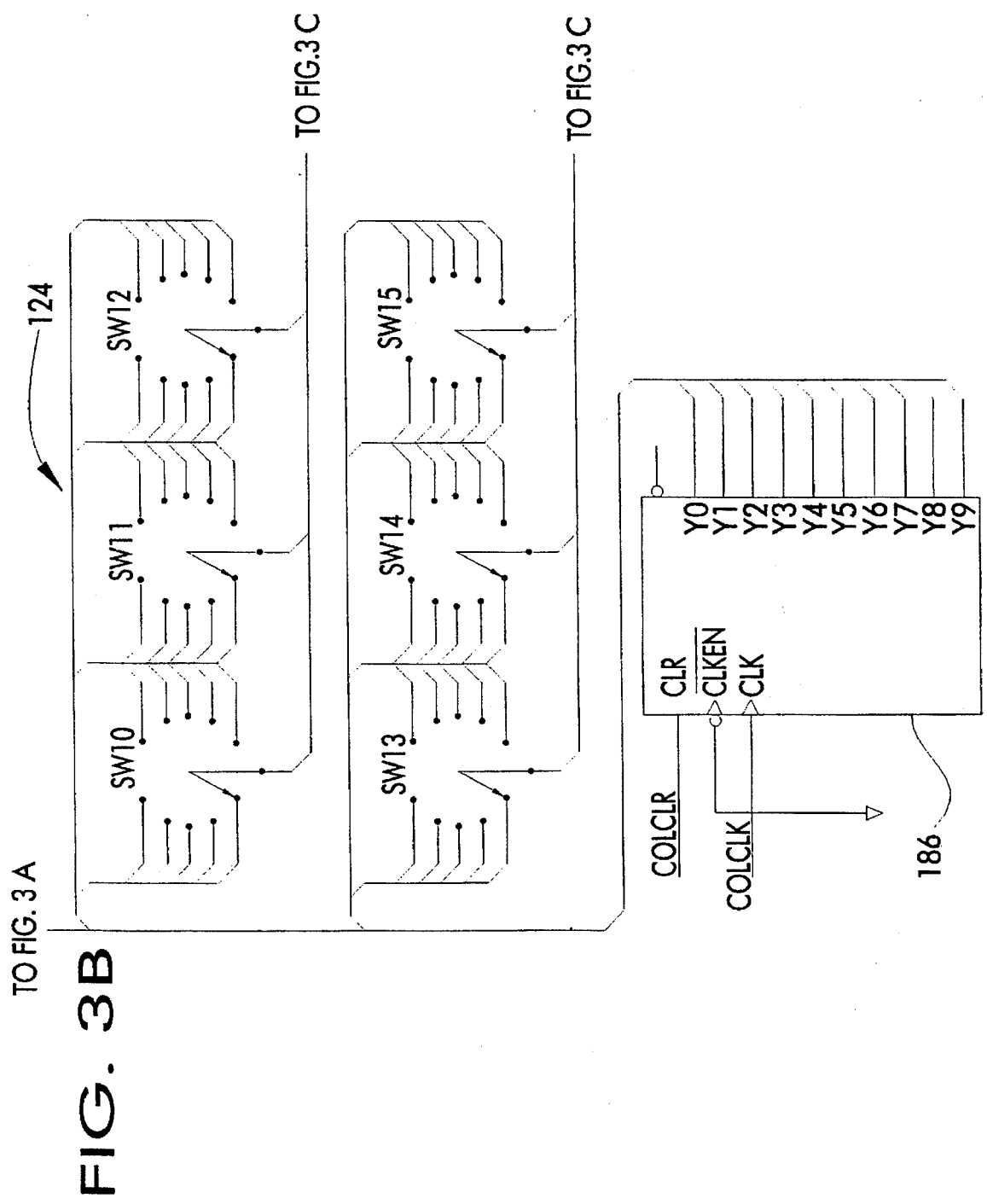

Referring now to FIGS. 3A–3C, control switch circuit 124 is shown in greater detail. According to the invention, an operator uses control switch circuit 124 to preselect first and second periods of time for setting the initiate and terminate signals. As illustrated, control switch circuit 124 is comprised of 15 single-pole switches (labeled SW1–SW15), each having ten positions. Further, as shown in FIGS. 3B–3C, control switch circuit 124 also includes two transparent latches 182 and 184, a decade counter 186, and 15 pull-down resistors 188. With switches SW1–SW15, the operator of system 100 is able to preselect a desired misting or watering sequence by setting the amount of time that each zone will be on and by setting the amount of time that each zone will be off between each on period. Further, the operator is able to preselect a starting time for the desired sequence which is a first period of time before the anticipated sunrise, at the next sunrise, or a first period of time after the next sunrise. Similarly, the operator is able to preselect an ending time for the desired sequence which is a second period of time before the anticipated sunset, at the next sunset, or a second period of time after the next sunset.

As an example, system 100 has six separate misting zones in which plants 106 are located. Each zone driver 114 controls one output which is set by two control switches (i.e., "seconds of on time" and "minutes between on time"). In the example, switches SW1, SW2, SW3, SW10, SW11, SW12 control "seconds of on time" for zones 1–6, respectively, and switches SW6, SW7, SW8, SW13, SW14, SW15 control "minutes between on time" for zones 1–6, respectively.

The "seconds of on time" switches set the amount of time mist is applied to the plants in a particular zone during each cycle or time period. These switches each have eight positions corresponding to 2, 4, 6, 8, 10, 12, 15 and 20 second intervals. The "minutes between on time" switches, on the other hand, set the minutes between mist application cycles (i.e., the off times between on times). The switches each have eight positions corresponding to 2, 4, 6, 10, 16, 20, 30, and 60 minute intervals and two additional positions for "OFF" and "ON". Normally, only one zone driver 114 will be enabled during any time interval. However, if the "minutes between on time" switch is set to "ON" for any of the zones, then both zones can be on at any one time. It is to be understood that the number of switch positions may vary according to the particular design requirements of system 100. For example, in an alternative embodiment, each "seconds of on time" switch may have ten positions corresponding to 2, 4, 6, 8, 10, 12, 14, 16, 18 and 20 second intervals.

Further to this example, when the setting of the "seconds of on time" switch is changed, the new setting is effective immediately. Therefore, if the "seconds of on time" switch for the first zone is set to six seconds and times out after six seconds, and then the operator increases this time to 15 seconds, the first zone driver 114 will continue operation until the 15 seconds has elapsed. On the other hand, if the first zone is set to 15 seconds and eight seconds has elapsed, and then the operator decreases this time to four seconds, the first zone driver 114 will terminate operation for the remainder of the cycle. Likewise, when the setting of the "minutes between on time" switch is changed, the new setting will be effective immediately.

In a preferred embodiment, control switch circuit 124 further includes a time extender control switch SW9 for increasing the "seconds of on time" and "minutes between on time". The time extender control increases the settings of these switches by multiples of 1, 2 or 3. In other words, if SW9 is set to 2, then a 15 "seconds of on time" setting will be increased to 30 seconds and a 10 "minutes between on time" setting will be increased to 20 minutes, for example.

Further still to this example, a "set to start misting" switch SW4 determines when the misting sequence is to begin. This switch has nine positions corresponding to 4, 3, 2 and 1 hours before dawn, 4, 3, 2 and 1 hours after dawn, and at dawn. Processor 110 preferably accepts changes in the "set to start misting" switch settings immediately as long as zone drivers 114 have not yet started operation. However, if zone drivers 114 have already started operation for the day, the change will take affect on the following day. Similarly, a "set to stop misting" switch SW5 determines when the misting sequence is to end. This switch also has nine positions corresponding to 4, 3, 2 and 1 hours before dusk, 4, 3, 2 and 1 hours after dusk, and at dusk. Preferably, processor 110 also accepts changes in the "set to stop misting" switch settings immediately as long as zone drivers 114 have not yet stopped operation. However, if zone drivers 114 have already stopped operation for the day, the change will take affect on the following day. Preferably, the "before dawn" or "before dusk" settings are provided based on the anticipated state changes whereas the "after dawn" or "after dusk" as well as the "at dawn" and "at dusk" settings are based on the present detected state changes.

Referring further to FIG. 3C, one preferred embodiment of the invention includes a jumper switch JP1 for initiating a diagnostic test prior to the initial operation of control circuit 102. For example, connecting the jumper switch JP1 and applying power places control circuit 102 into a continuous series of diagnostic tests. This mode is generally used for trouble shooting and initial checkout. To exit this mode, the power is removed and then reapplied with jumper JP1 disconnected. An optional diagnostic test may be run continuously during operation of control circuit 102 to detect and report open or defective switches.

Figure 4:
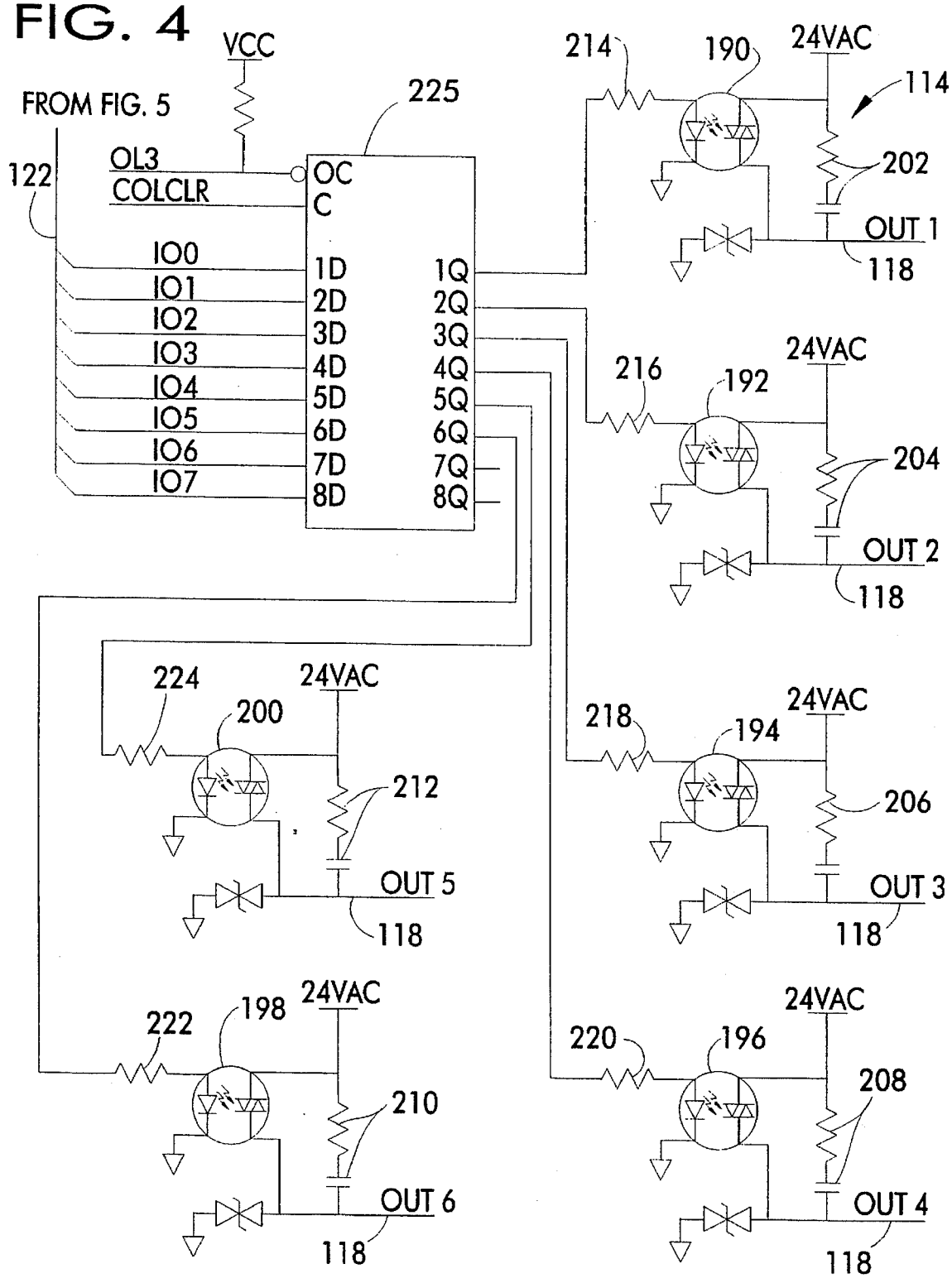
FIG. 4 is a schematic diagram of a zone driver circuit of the control circuitry of FIG. 1.

As shown in FIG. 4, zone drivers 114 preferably comprise a plurality of power optoisolators 190, 192, 194, 196, 198, 200 (e.g., model MOC2A40-5 optoisolator manufactured by Motorola), each providing a 24 VAC output. In the illustrated embodiment, there are six zone drivers 114. Each zone driver 114 further includes a corresponding resistor-capacitor snubber network 202, 204, 206, 208, 210, 212, respectively, and a corresponding current limiting resistor 214, 216, 218, 220, 222, 224, respectively. In a preferred embodiment, the current limiting resistors 214, 216, 218, 220, 222, 224 limit the current driving the optoisolators 190, 192, 194, 196, 198, 200. FIG. 4 also illustrates a transparent latch 225 which, when enabled, becomes a transparent section of the data path so that the input data values reappear at the output. When the transparent latch 225 is disabled, however, the last value applied to latch 225 is "frozen" and held until the enabling signal is reapplied.

Figure 5:
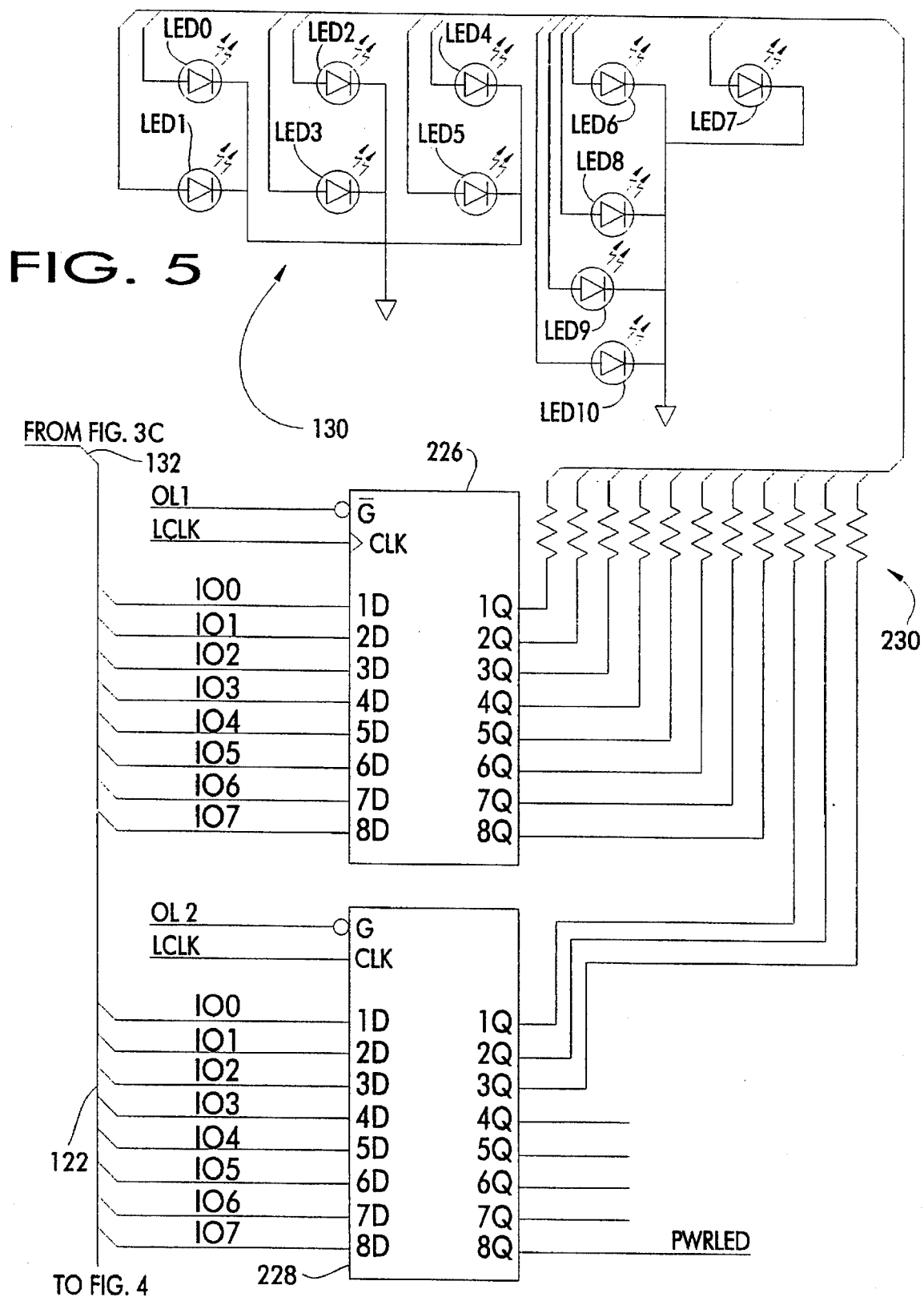
FIG. 5 is a schematic diagram of a display circuit of the control circuitry of FIG. 1.

FIG. 5 illustrates a preferred embodiment of display 130 comprising a pair of octal D-type flip flops 226, 228. Display 130 also includes 11 light emitting diodes (labeled LED0–LED10) and 11 resistors 230 for limiting the LED drive current. When any zone driver 114 has an active output, the corresponding LED is illuminated.

As shown in the schematic diagrams of FIGS. 2–5, lines 122, 126 and 132 preferably comprise a data bus for communication to and from processor 110.

FIGS. 6A–6E and FIGS. 7A–7C illustrate the operation of control circuit 102 according to a preferred embodiment of the present invention in the form of flow diagrams 250 and 360, respectively. In a preferred embodiment of the invention, processor 110 of control circuit 102 performs the operations illustrated by the flow diagram 250 in combination with the operations illustrated by the flow diagram 360 for controlling system 100 having two misting or watering zones.

Figure 6A:
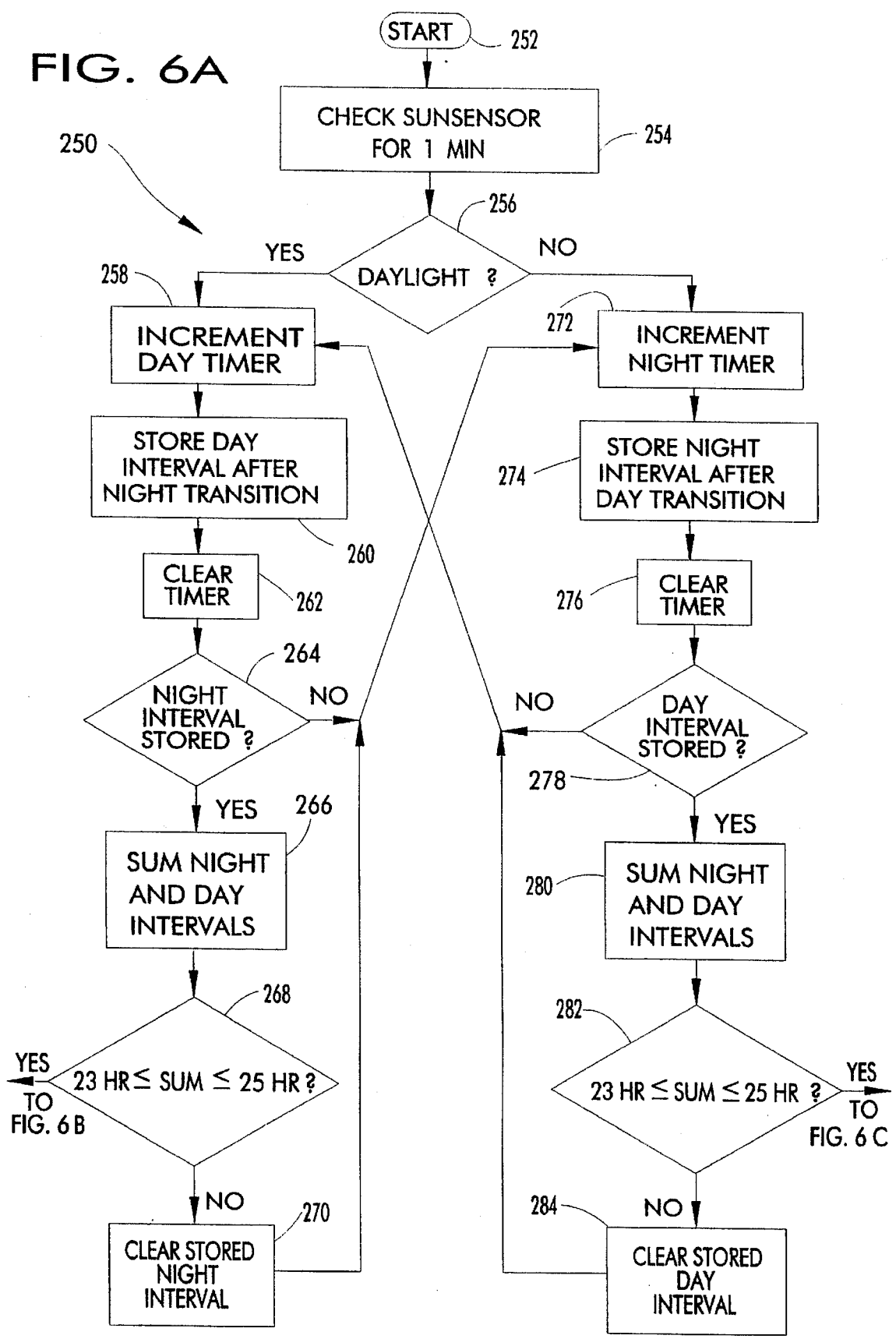
FIGS. 6A, 6B, 6C, 6D and 6E are a flow diagram illustrating operation of the processor of FIG. 2 according to a preferred embodiment of the invention.

As shown in FIG. 6A, after beginning at step 252, processor 110 proceeds to step 254 for checking the SUNSENSOR signal at line 112. Preferably, processor 110 detects the SUNSENSOR signal for one minute after being powered up. At step 256, processor 110 determines whether the detected light is in the first state (i.e., night) or the second state (i.e., day) based on the SUNSENSOR signal. If a day state is detected, processor 110 proceeds to step 258 for incrementing its timer. The timer preferably counts the hours and minutes of daylight (i.e., the day interval), referred to above as the second interval. After detecting a change from the second state to the first state (i.e., dusk), processor 110 stores at step 260 the day interval counted by the timer. The timer is then cleared at step 262.

At step 264, processor 110 determines if a corresponding night interval, referred to above as the first interval, is stored in memory 136. If so, processor 110 validates this detected state change at steps 266 and 268. At step 266, processor 110 sums the stored night and day intervals and, at step 268, compares the sum to 24 hours. If the sum is within an hour of 24 hours, processor 110 proceeds to the portion of flow diagram 250 shown in FIG. 6B. If the sum is not within an hour of 24 hours, processor 110 clears the stored night interval at step 270 as being invalid and proceeds to step 272.

On the other hand, if processor 110 detects a night state at step 256, it proceeds directly to step 272. Also, if processor 110 determines at step 264 that a night interval has not yet been stored, it proceeds directly to step 272. At step 272, processor 110 increments its timer for counting the hours and minutes of night (i.e., the night interval). After detecting a change from the first state to the second state (i.e., dawn), processor 110 stores at step 274 the night interval counted by the timer. The timer is then cleared at step 276.

At step 278, processor 110 determines if a corresponding day interval is stored in memory 136. If so, processor 110 validates the detected state change at steps 280 and 282. Otherwise, processor 110 returns to step 258. At step 280, processor 110 again sums the stored night and day intervals and, at step 282, compares the sum to 24 hours. In this instance, if the sum is within an hour of 24 hours, processor 110 proceeds to the portion of flow diagram 250 shown in FIG. 6C. If the sum is not within an hour of 24 hours, processor 110 clears the stored day interval at step 284 as being invalid and returns to step 258.

Figure 6B:
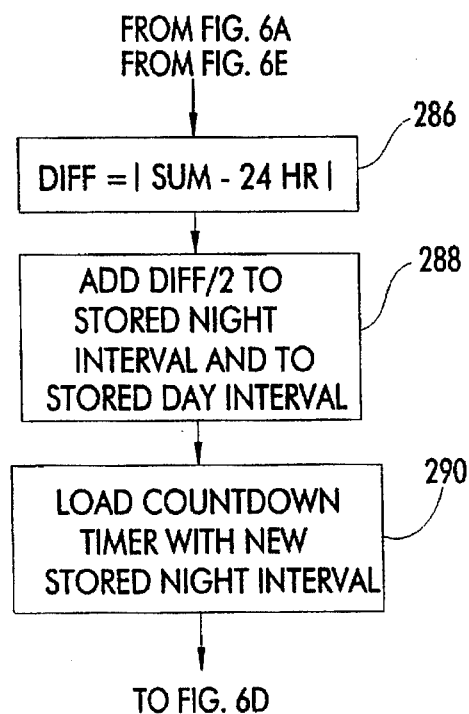

Referring now to FIG. 6B, after determining at step 268 that the sum of the most recent day and night intervals is within 23 and 25 hours, processor 110, at step 286, finds the absolute difference in minutes between the sum and 24 hours. At step 288, the difference is divided by two and then added to the stored day and night intervals. Processor 110 then loads a countdown timer with the new night interval (i.e., the stored night interval plus half the difference) at step 290. Following step 290, processor 110 proceeds to the portion of flow diagram 250 shown in FIG. 6D.

Figure 6C:
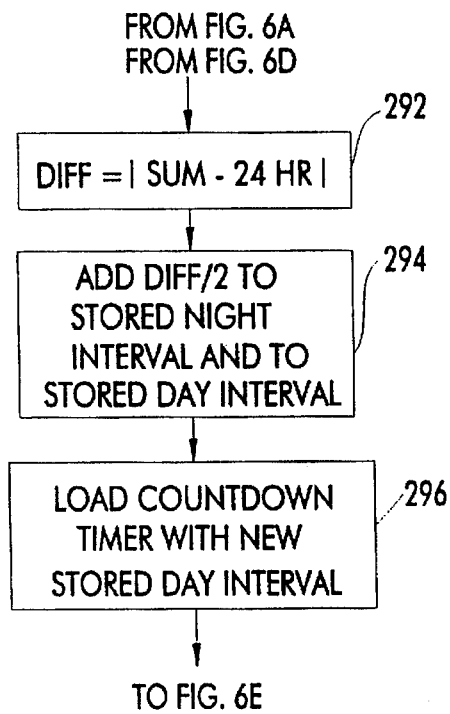

FIG. 6C is similar to FIG. 6B. After determining at step 282 that the sum of the most recent day and night intervals is within 23 and 25 hours, processor 110, at step 292, finds the absolute difference in minutes between the sum and 24 hours. At step 294, the difference is divided by two and then added to the stored day and night intervals. Processor 110 then loads a countdown timer with the new day interval (i.e., the stored day interval plus half the difference) at step 296. Following step 296, processor 110 proceeds to the portion of flow diagram 250 shown in FIG. 6E.

Figure 6D:
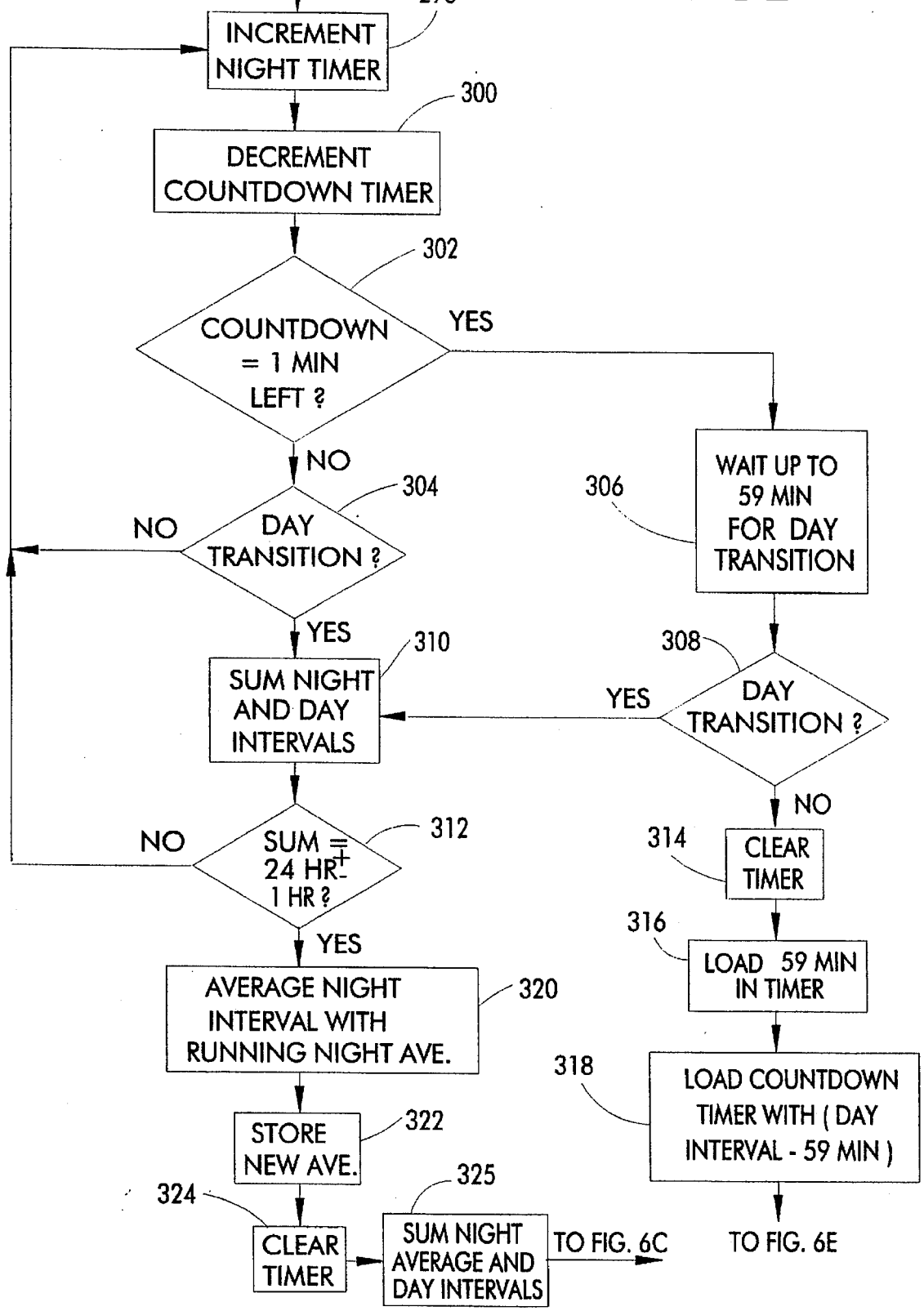

Referring now to FIG. 6D, after loading the countdown timer with the new night interval at step 290, processor 110 increments the night timer at step 298 and decrements the countdown timer at step 300 as the first state continues. At step 302, processor 110 determines whether one minute, for example, is left to be counted down by the countdown timer. In a preferred embodiment, one minute is the smallest increment of time counted down by the countdown timer of processor 110. If more than one minute is left, processor 110 determines at step 304 whether a change from night to day has been detected. On the other hand, if only one minute is left, processor 110 waits for up to 59 minutes at step 306 for a transition to occur. After 59 minutes has passed, processor 110 then determines at step 308 whether a change from night to day has been detected. If a state change is detected at either of steps 304 or 308, processor 110 validates the detected state change at steps 310 and 312 before proceeding. If no state change has been detected, however, processor 110 returns to step 298 from step 304 or proceeds to step 314 from step 308.

At step 314, processor 110 clears the interval timer and then loads it with a time of 59 minutes at step 316. The countdown timer of processor 110 is then loaded at step 318 with the last timed interval of daylight minus 59 minutes. Following step 318, processor 110 proceeds to the portion of flow diagram 250 shown in FIG. 6E.

Referring again to steps 310 and 312, processor 110 validates the detected state changes as before by summing the stored night and day intervals at step 310 and comparing the sum to 24 hours at step 312. If the sum is not within an hour of 24 hours, however, processor 110 continues timing the night interval at step 298. If the sum is within an hour of 24 hours, processor 110 proceeds to step 320 for averaging the night interval with a running average of the nighttime hours and minutes from previous first states. Processor 110 then stores the new average at step 322 and clears its timer at step 324. Following step 324, processor 110 sums the night average and day intervals at step 325 and returns to the portion of flow diagram 250 shown in FIG. 6C at step 292.

Figure 6E:
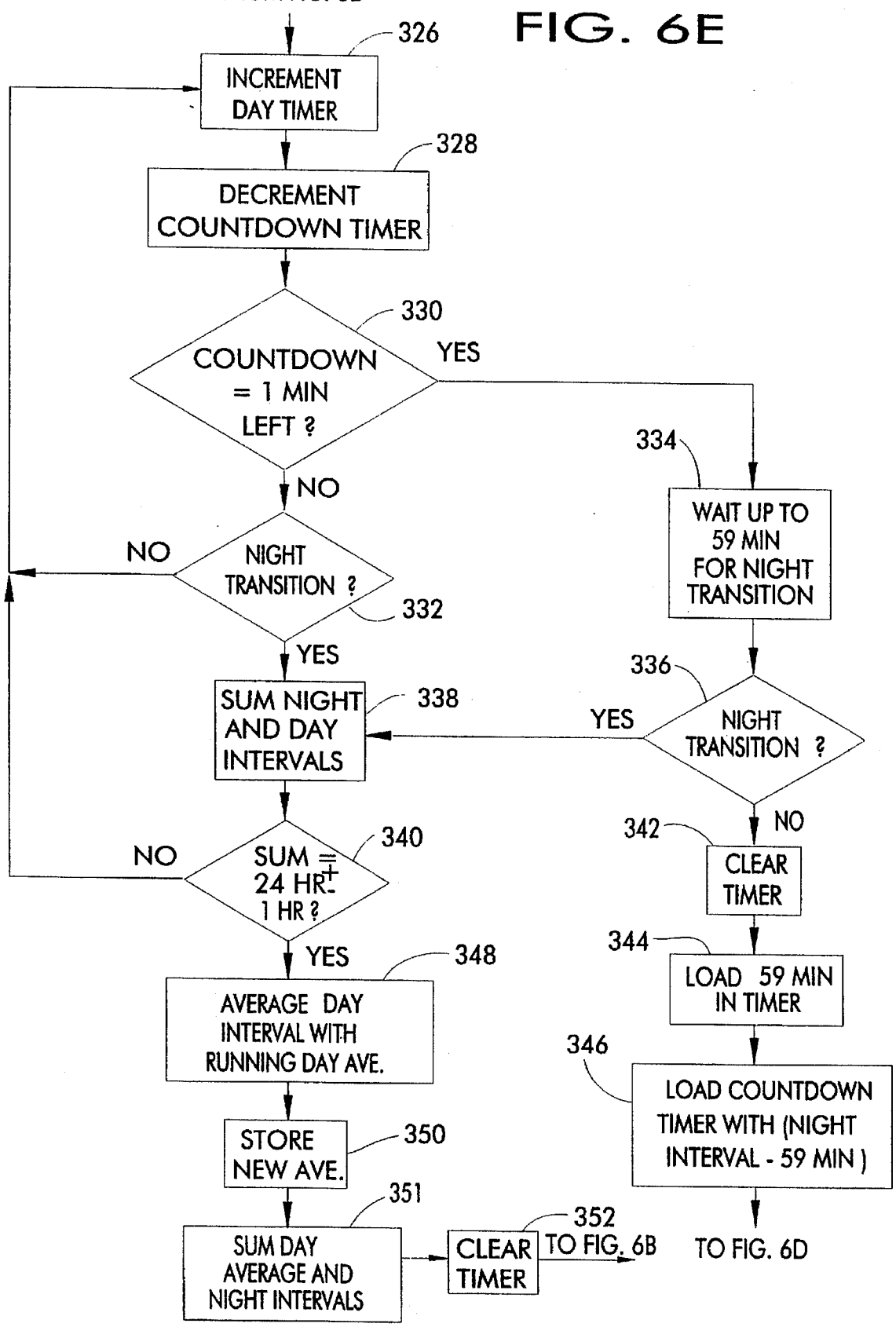

Referring now to FIG. 6E, flow diagram 250 continues at step 326 from either step 296 or step 318. As shown in FIG. 6E, after loading the countdown timer with the new day, processor 110 increments the day timer at step 326 and decrements the countdown timer at step 328 as the second state continues. At step 330, processor 110 determines whether one minute is left to be counted down by the countdown timer. If more than one minute is left, processor 110 determines at step 332 whether a change from day to night has been detected. On the other hand, if only one minute is left, processor 110 waits for up to 59 minutes at step 334 for a transition to occur. After 59 minutes has passed, processor 110 then determines at step 336 whether a change from day to night has been detected. If a state change is detected at either of steps 332 or 336, processor 110 validates the detected state at steps 338 and 340 before proceeding. If no state change has been detected, however, processor 110 returns to step 326 from step 332 or proceeds to step 342 from step 336.

At step 342, processor 110 clears the interval timer and then loads it with a time of 59 minutes at step 344. The countdown timer of processor 110 is then loaded at step 346 with the last timed interval of night minus 59 minutes. Following step 346, processor 110 returns to the portion of flow diagram 250 shown in FIG. 6D at step 298.

Referring again to steps 338 and 340, processor 110 validates the detected state changes as before by summing the stored night and day intervals at step 338 and comparing the sum to 24 hours at step 340. If the sum is not within an hour of 24 hours, however, processor 110 continues timing the day interval at step 326. If the sum is within an hour of 24 hours, processor 110 proceeds to step 348 for averaging the day interval with a running average of the daytime hours and minutes from previous second states. Processor 110 then stores the new average at step 350, sums the day average and night intervals and step 351 and then clears its timer at step 352 before returning to the portion of flow diagram 250 shown in FIG. 6B at step 286.

Figure 7B:
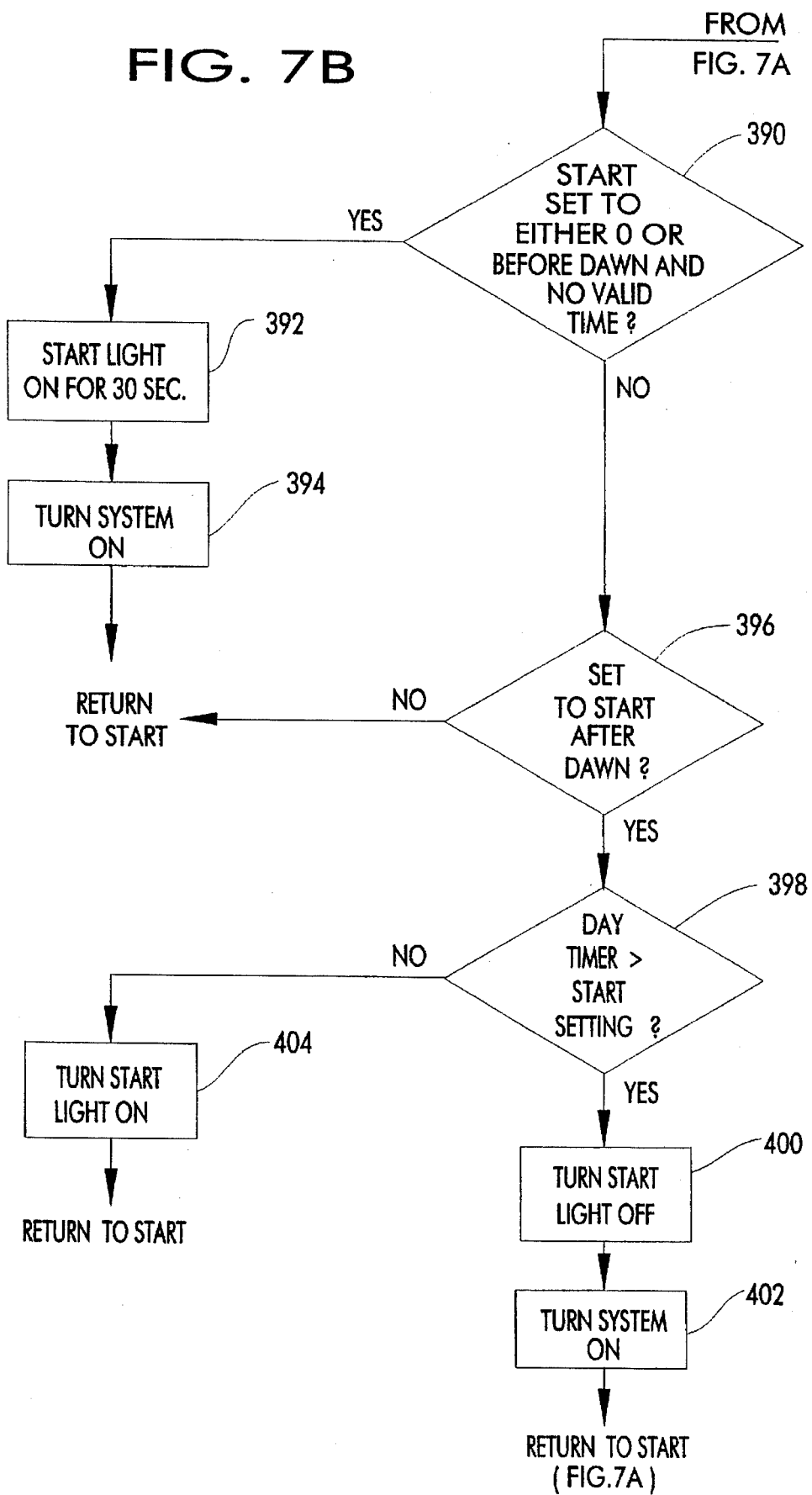
Figure 7C:
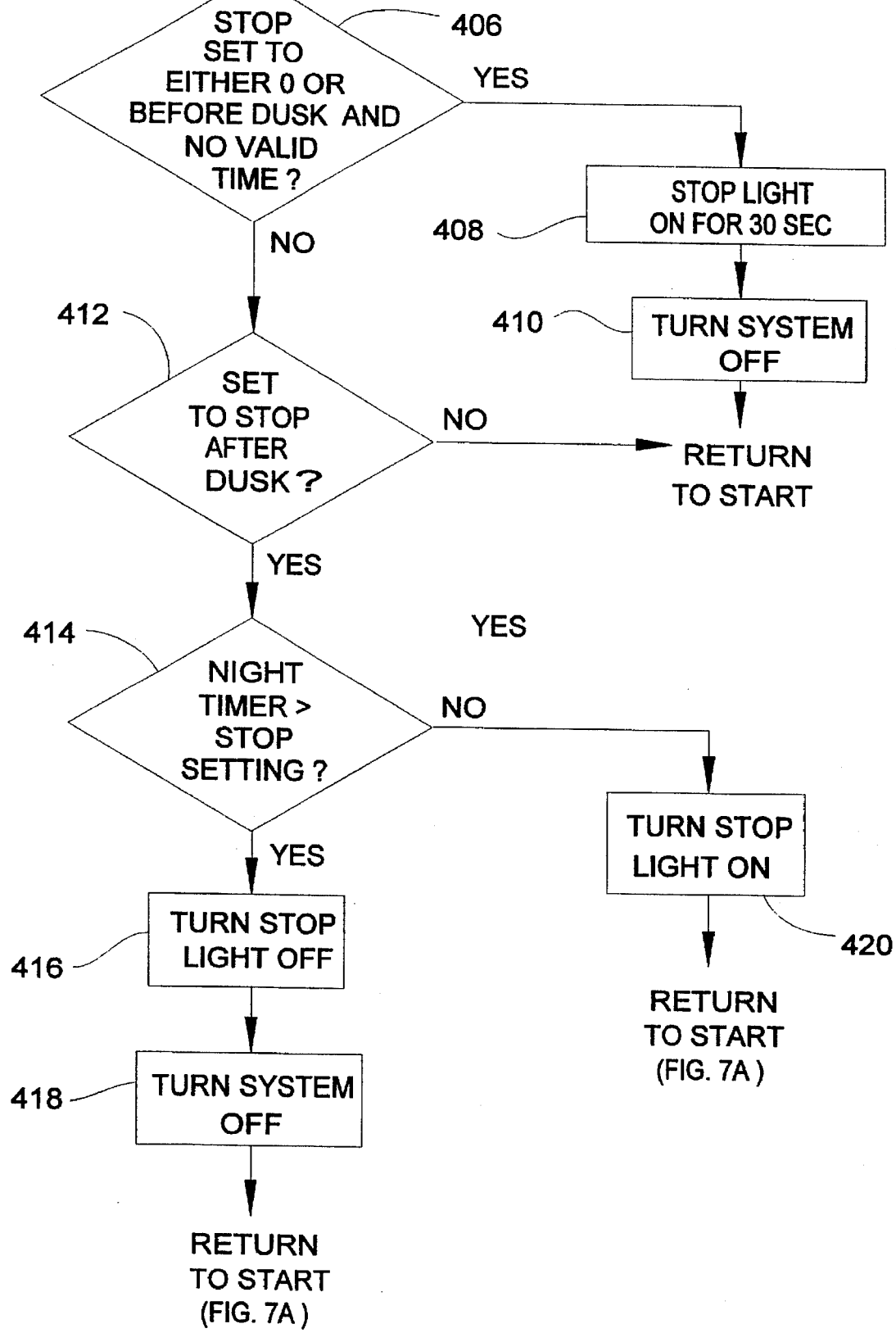

Referring now to FIGS. 7A–7C, flow diagram 360 begins at step 362 for determining when to activate and deactivate the misting or watering sequence of system 100 based on the settings of control switch circuit 124 and the information regarding dawn and dusk determined by processor 110 performing flow diagram 250. At step 364, processor 110 checks the SUNSENSOR signal at line 112 to determine whether the detected light is in either the first (i.e., night) or second (i.e., day) state. If a day state is detected, processor 110 proceeds to step 366 to determine whether system 100 is active. In other words, processor 110 determines whether system 100 is supplying water to plants 106 in accordance with the desired misting or watering sequence.

If system 100 is not active as determined at step 366, processor 110 proceeds to the portion of flow diagram 360 shown in FIG. 7B. However, if system 100 is active, processor 110 determines at step 368 whether the system operator selected a misting or watering sequence via control switch circuit 124 that is to stop before dusk. If system 100 is not set to stop before dusk, processor 110 returns to step 362. Otherwise, processor 110 proceeds to step 370 for detecting whether a valid night/day interval was established during operation according to flow diagram 250. If processor 110 validated the interval, processor 110 proceeds to step 372 but if not, processor 110 returns to step 362. Processor 110 then determines at step 372 whether the countdown timer already counted down below the "stop" setting of control switches 124 (i.e., the desired period of time before dusk for stopping the sequence). After the countdown timer reaches the "stop" switch setting, processor 110 turns off system 100 at step 374 and turns on the "stop" indicator light of display 130 at step 376 until dusk. If processor 110 determines at step 372 that the countdown timer has not yet counted down below the "stop" setting, processor 110 returns to step 362. Processor 110 also returns to step 362 following step 376.

Alternatively, if processor 110 detects a night state at step 364, it proceeds to step 378 to determine whether system 100 is active. In this instance, if system 100 is active, processor 110 proceeds to the portion of flow diagram 360 shown in FIG. 7C. However, if system 100 is inactive, processor 110 determines at step 380 whether the system operator selected a misting or watering sequence via control switch circuit 124 that is to start before dawn. If system 100 is not set to start before dawn, processor 110 returns to step 362. Otherwise, processor 110 proceeds to step 382 for detecting whether a valid day/night interval was established during operation according to flow diagram 250. If processor 110 validated the interval, processor 110 proceeds to step 384 but if not, processor 110 returns to step 362. Processor 110 then determines at step 384 whether the countdown timer has already counted down below the "start" setting of control switches 124 (i.e., the desired period of time before dawn for starting the sequence). After the countdown timer reaches the "start" switch setting, processor 110 turns on system 100 at step 386 and turns on the "start" indicator light of display 130 at step 388 until dawn. If processor 110 determines at step 384 that the countdown timer has not yet counted down below the "start" setting, processor 110 returns to step 362. Processor 110 also returns to step 362 following step 388.

If processor 110 detects a day state at step 364 but system 100 is inactive, as determined at step 366, flow diagram 360 proceeds to the portion shown in FIG. 7B. At step 390, processor 110 detects the setting of control switch circuit 124 to determine whether the "start" setting is either at dawn or before dawn and whether a valid night/day interval was established during operation according to flow diagram 250. If the "start" setting is either at dawn or before dawn and processor 110 did not validate the interval, processor 110 proceeds to step 392 for turning on the "start" light of display 130 for a period of time, such as 30 seconds, and then to step 394 for activating system 100. Otherwise, processor 110 determines at step 396 whether control switch circuit 124 is set to start system 100 after dawn. If system 100 is not set to start after dawn, processor 110 returns to step 362. Processor 110 also returns to step 362 following step 394. On the other hand, if control switch circuit 124 is set to start system 100 after dawn, processor 110 proceeds to step 398. At step 398, processor 110 determines whether the day timer has already counted up to the "start" setting of control switches 124 (i.e., the desired period of time after dawn for starting the sequence). After the day timer reaches the "start" switch setting, processor 110 turns off the "start" indicator light of display 130 at step 400 and turns on system 100 at step 402. If processor 110 determines at step 398 that the day timer has not yet counted up to the "start" setting, processor 110 turns on the "start" light at step 404 and then returns to step 362. Processor 110 also returns to step 362 following step 402.

If processor 110 detects a night state at step 364 but system 100 is still active, as determined at step 378, flow diagram 360 proceeds to the portion shown in FIG. 7C. At step 406, processor 110 detects the setting of control switch circuit 124 to determine whether the "stop" setting is either at dusk or before dusk and whether a valid day/night interval was established during operation according to flow diagram 250. If the "stop" setting is either at dusk or before dusk and processor 110 did not validate the interval, processor 110 proceeds to step 408 for turning on the "stop" light of display 130 for a period of time, such as 30 seconds, and then to step 410 for deactivating system 100. Otherwise, processor 110 determines at step 412 whether control switch circuit 124 is set to stop system 100 after dusk. If system 100 is not set to stop after dusk, processor 110 returns to step 362. Processor 110 also returns to step 362 following step 410. On the other hand, if control switch circuit 124 is set to stop system 100 after dusk, processor 110 proceeds to step 414. At step 414, processor 110 determines whether the night timer has already counted up to the "stop" setting of control switches 124 (i.e., the desired period of time after dusk for stopping the sequence). After the night timer reaches the "stop" switch setting, processor 110 turns off the "stop" indicator light of display 130 at step 416 and turns off system 100 at step 418. If processor 110 determines at step 414 that the night timer has not yet counted up to the "stop" setting, processor 110 turns on the "stop" light at step 420 and then returns to step 362. Processor 110 also returns to step 362 following step 418.

FIGS. 8A–8C and FIGS. 9A–9B illustrate the operation of control circuit 102 in the form of flow diagrams 450 and 550, respectively. In an alternative embodiment of the invention, processor 110 of control circuit 102 performs the operations illustrated by the flow diagram 450 in combination with the operations illustrated by the flow diagram 550 for controlling system 100 having six misting or watering zones rather than the operations illustrated by flow diagrams 250 and 360.

Figure 8A:
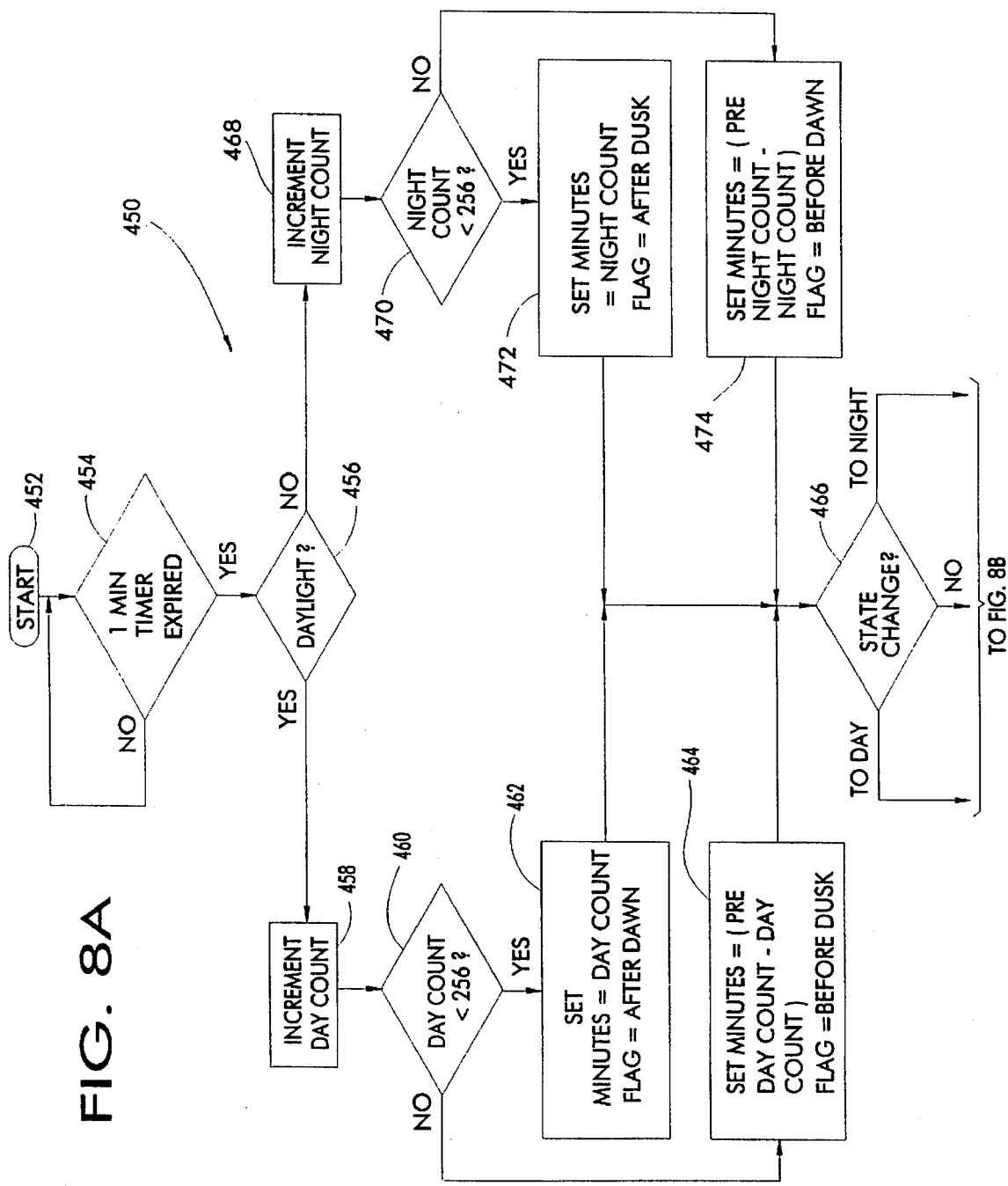
FIGS. 8A, 8B and 8C are a flow diagram illustrating operation of the processor of FIG. 2 according to another preferred embodiment of the invention.

As shown in FIG. 8A, after beginning at step 452, processor 110 proceeds to steps 454 and 456 for checking the SUNSENSOR signal at line 112. Preferably, at step 454, processor 110 delays for one minute after being powered up before detecting the SUNSENSOR signal. At step 456, processor 110 determines whether the detected light is in the first (i.e., night) or second (i.e., day) state. If a day state is detected, processor 110 proceeds to step 458 for incrementing its timer (referred to here as DAY COUNT). The DAY COUNT is preferably a count of the minutes of daylight and is used to determine a value DAY TIME which is indicative of the duration of the second state, referred to above as the second interval, from the previous day. At step 460, processor 110 compares DAY COUNT to 256 minutes. If DAY COUNT is less than 256, processor 110 proceeds to step 462 for storing the DAY COUNT as a value MINUTES and for setting an "after dawn" flag. If DAY COUNT is not less than 256, however, processor 110 proceeds to step 464 for storing the difference between DAY TIME (i.e., the DAY COUNT from the previous day) and the current DAY COUNT as the value MINUTES. At step 464, processor 110 also sets a "before dusk" flag. Following either of steps 462 or 464, processor 110 detects at step 466 whether a state change has occurred, namely, whether the state of the detected light has changed from day to night or from night to day.

Referring again to step 456, if a night state is detected, processor 110 proceeds to step 468 for incrementing its timer (referred to here as NIGHT COUNT). The NIGHT COUNT is preferably a count of the minutes of darkness and is used to determine a value NIGHT TIME which is indicative of the duration of the first state, referred to above as the first interval, from the previous day. At step 470, processor 110 compares NIGHT COUNT to 256 minutes. If NIGHT COUNT is less than 256, processor 110 proceeds to step 472 for storing the NIGHT COUNT as the value MINUTES and for setting an "after dusk" flag. If NIGHT COUNT is not less than 256, however, processor 110 proceeds to step 474 for storing the difference between NIGHT TIME (i.e., the NIGHT COUNT from the previous day) and the current NIGHT COUNT as the value MINUTES. At step 474, processor 110 also sets a "before dawn" flag. As before, following either of steps 472 or 474, processor 110 detects at step 466 whether a state change has occurred.

Figure 8B:
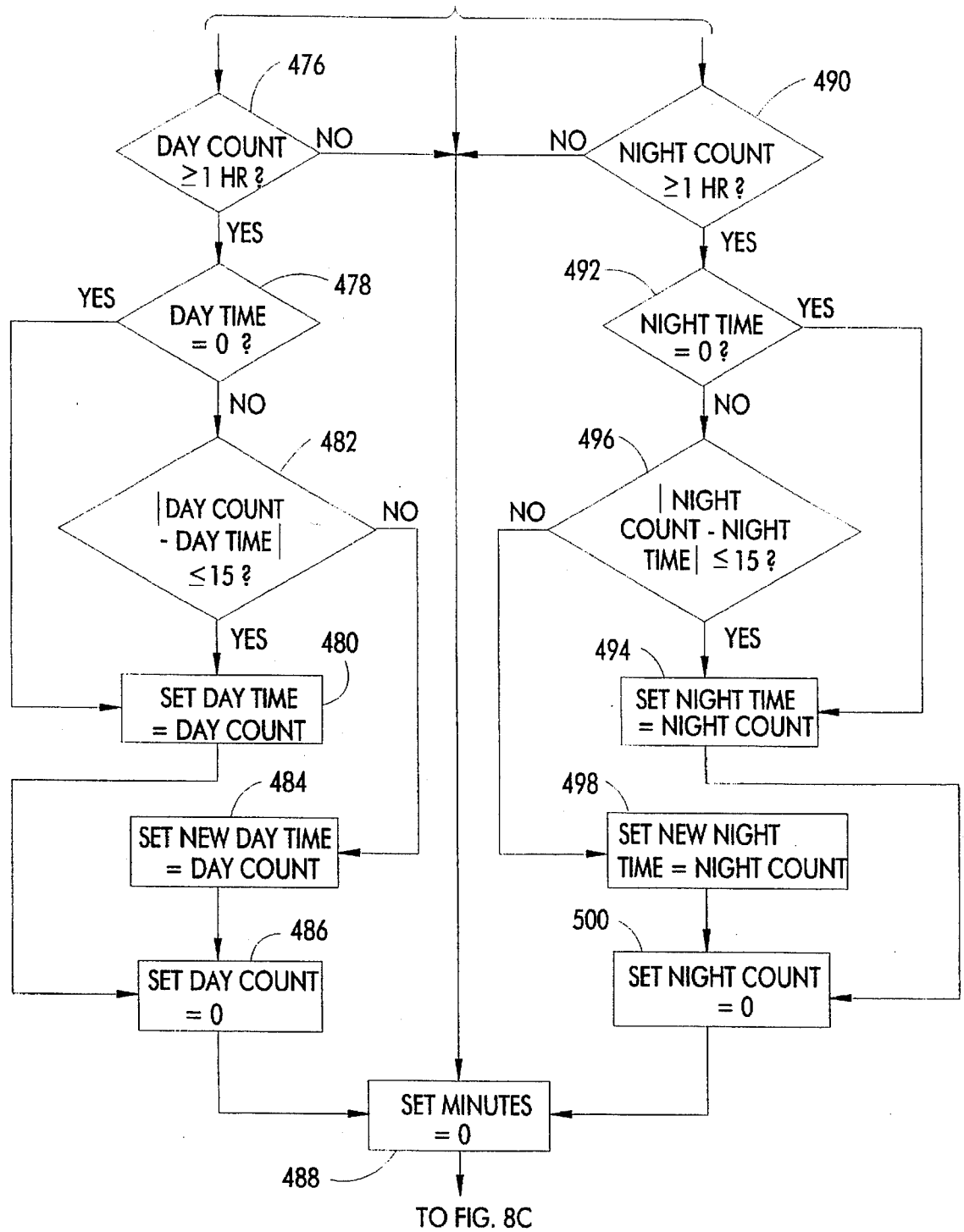

Referring now to FIG. 8B, after detecting at step 466 that a change from the first state to the second state has occurred (i,e., dawn), processor 110 determines at step 476 whether DAY COUNT is greater than or equal to one hour. If so, processor 110 then determines at step 478 whether the value DAY TIME is zero. If DAY TIME equals zero, indicating that a DAY COUNT from the previous day has not been counted, processor 110 stores the present DAY COUNT as the value DAY TIME at step 480. However, if DAY TIME is not zero, processor 110 determines the absolute value of the difference between DAY COUNT and DAY TIME and compares it to 15 minutes at step 482. If the difference is 15 minutes or less, processor 110 determines that the DAY COUNT is valid and stores it in DAY TIME at step 480. On the other hand, if the difference is greater than 15 minutes, processor 110 stores DAY COUNT as a value NEW DAY TIME at step 484 and continues to store the previous value of DAY TIME. Following steps 480 and 484, processor 110 proceeds to step 486 for clearing DAY COUNT. At step 488, processor 110 also clears the value MINUTES.

On the other hand, after detecting at step 466 that a change from the second state to the first state has occurred (i.e, dusk), processor 110 determines at step 490 whether NIGHT COUNT is greater than or equal to one hour. If so, processor 110 then determines at step 492 whether the value NIGHT TIME is zero. If NIGHT TIME equals zero, indicating that a NIGHT COUNT from the previous day has not been counted, processor 110 stores the present NIGHT COUNT as the value NIGHT TIME at step 494. However, if NIGHT TIME is not zero, processor 110 determines the absolute value of the difference between NIGHT COUNT and NIGHT TIME and compares it to 15 minutes at step 496. If the difference is 15 minutes or less, processor 110 determines that the NIGHT COUNT is valid and stores it in NIGHT TIME at step 494. On the other hand, if the difference is greater than 15 minutes, processor 110 stores NIGHT COUNT as a value NEW NIGHT TIME at step 498 and continues to store the previous value of NIGHT TIME. Following steps 494 and 498, processor 110 proceeds to step 500 for clearing NIGHT COUNT. Following step 500, processor 110 also clears the value MINUTES at step 488.

Returning to step 466, if a state change is not detected, or if processor 110 determines at step 476 that DAY COUNT is less than one hour or determines at step 490 that NIGHT COUNT is less than one hour, processor 110 immediately proceeds to step 488 for clearing the value MINUTES.

Figure 8C:
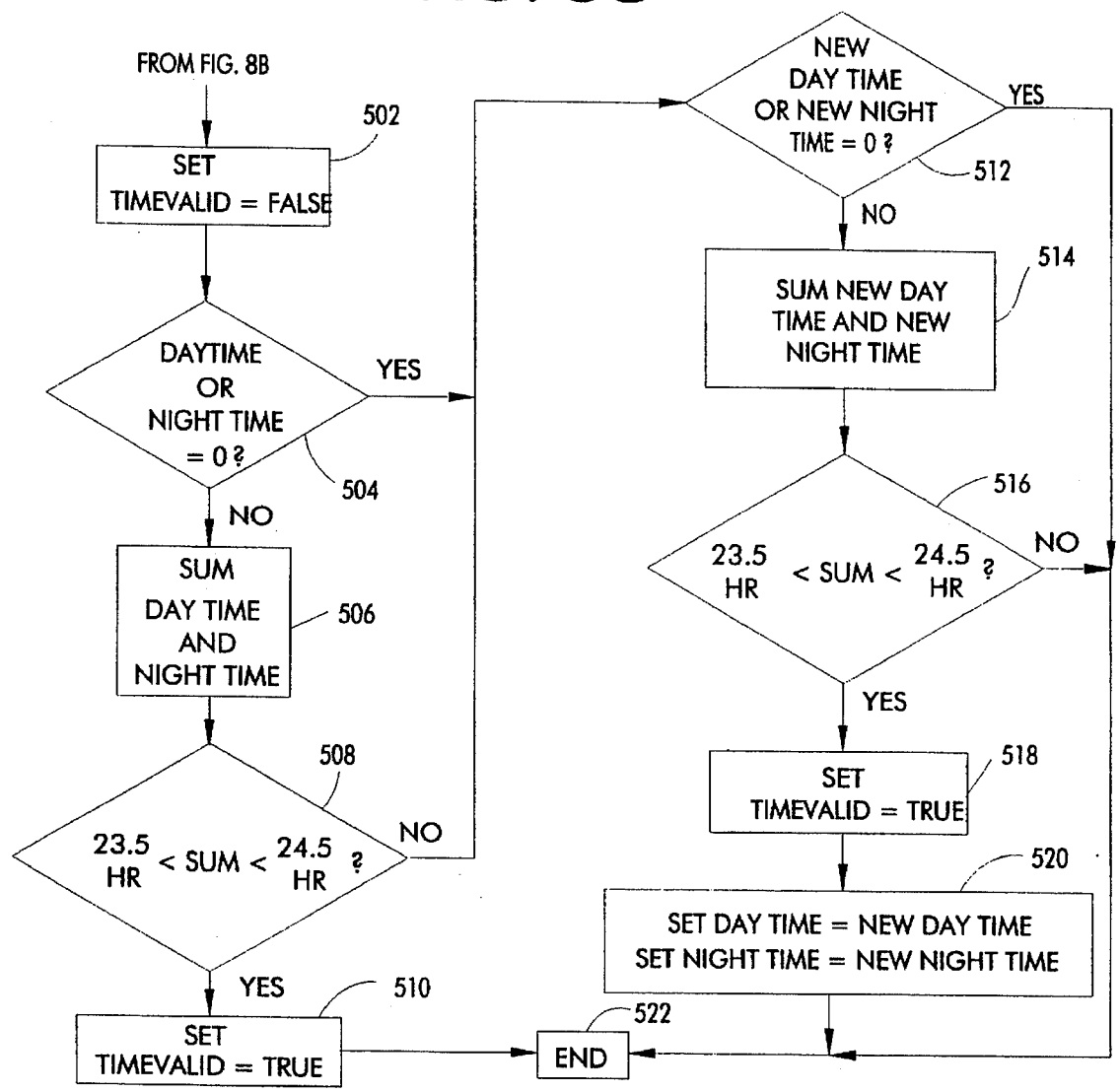

Following step 488, processor 110 proceeds to the portion of flow diagram 450 shown in FIG. 8C for performing a "check time" routine to validate the timed intervals of daylight or darkness. At step 502, processor 110 sets a value TIMEVALID to FALSE for use in flow diagram 550. The FALSE setting assumes that the timed intervals are invalid. Processor 110 then performs a validation routine comprised of steps 504 and 506. At step 504, processor 110 determines whether either DAY TIME or NIGHT TIME equals zero. If not, processor 110 sums DAY TIME and NIGHT TIME at step 506 and determines at step 508 whether the sum is between 23.5 hours and 24.5 hours. If the sum is within this range, processor sets the value TIMEVALID to TRUE at step 510.

On the other hand, if processor 110 determines at step 504 that DAY TIME or NIGHT TIME equals zero, or if processor 110 determines at step 508 that the sum of DAY TIME and NIGHT TIME is outside the range of 23.5 hours to 24.5 hours, processor 110 performs another validation routine comprised of steps 512 and 514. At step 512, processor 110 determines whether either NEW DAY TIME or NEW NIGHT TIME equals zero. If not, processor 110 sums NEW DAY TIME and NEW NIGHT TIME at step 514 and determines at step 516 whether the sum is between 23.5 hours and 24.5 hours. If the sum is within this range, processor 110 sets the value TIMEVALID to TRUE at step 518 and stores the NEW DAY TIME value as DAY TIME and stores the NEW NIGHT TIME value as NIGHT TIME at step 520.

If, however, processor 110 determines at step 512 that NEW DAY TIME or NEW NIGHT TIME does equal zero, or if processor 110 determines at step 516 that the sum of NEW DAY TIME and NEW NIGHT TIME is outside the range of 23.5 hours to 24.5 hours, processor 110 ends at step 522. Processor 110 also proceeds to the end step 522 following steps 510 and 520.

Figure 9A:
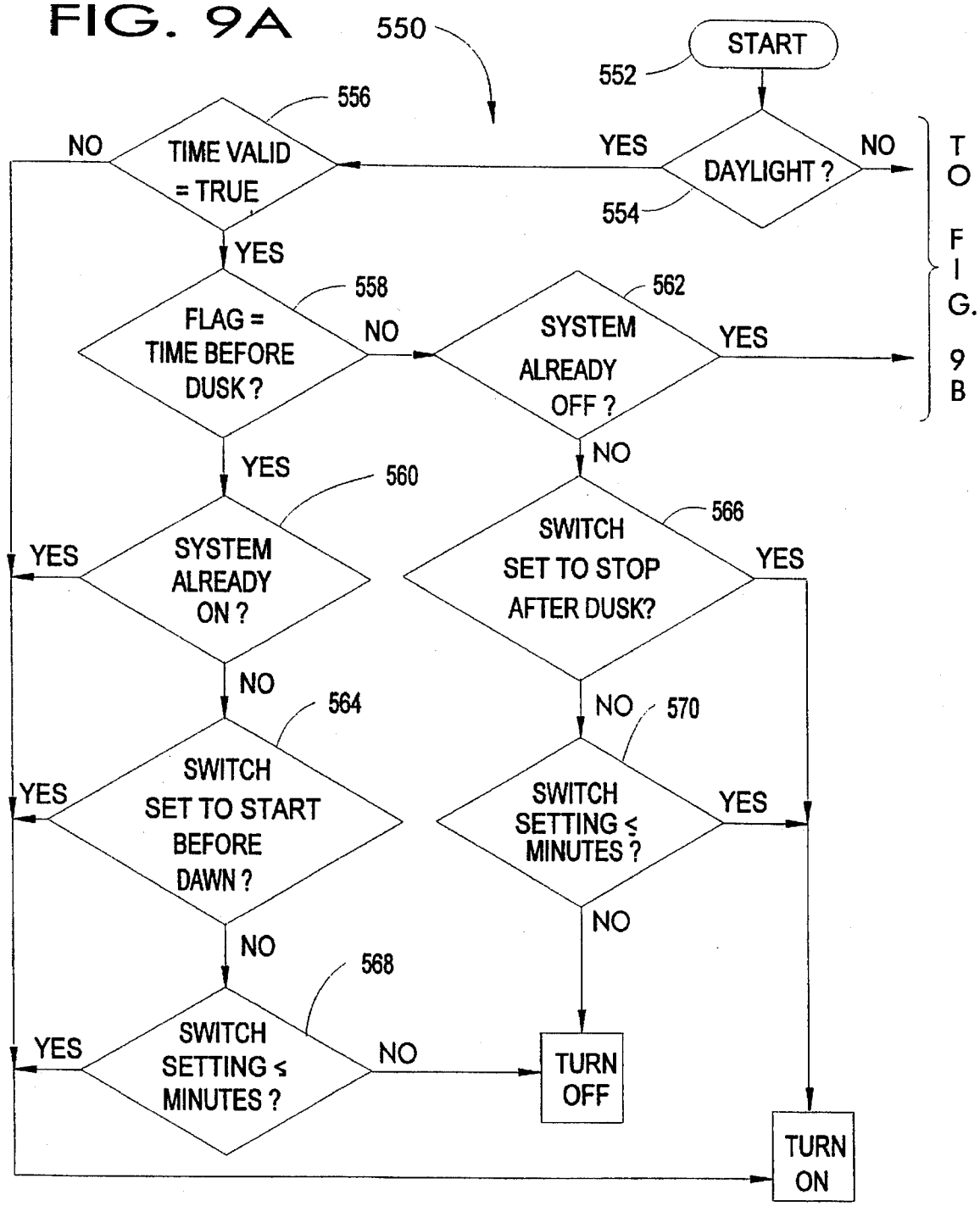

Referring now to FIGS. 9A–9B, flow diagram 550 begins at step 552 for determining when to activate and deactivate the misting or watering sequence of system 100 based on the settings of control switch circuit 124 and the information regarding dawn and dusk determined by processor 110 performing flow diagram 450. At step 554, processor 110 checks the SUNSENSOR signal at line 112 to determine whether the detected light is in the first state (i.e., night) or the second state (i.e., day). If a day state is detected, processor 110 proceeds to step 556 to determine if the value TIMEVALID is TRUE from flow diagram 450. If so, processor 110 detects at step 558 whether the "before dusk" flag is set. Depending on the flag at step 558, processor 110 proceeds to either step 560 or step 562. If the "before dusk" flag is set, processor 110 determines at step 560 whether system 100 is already turned on. If so, it remains on. If not, processor 110 proceeds to step 564. On the other hand, if system 100 is already active, it remains active.

Referring again to step 558, if the "before dusk" flag is not set, processor 110 determines at step 562 whether system 100 is presently inactive. If not, processor 110 proceeds to step 566. If system 100 is inactive, though, it remains off.

At step 564, processor 110 determines whether system 100 is set to activate before dawn and if it is, system 100 is turned on. Otherwise, processor 110 proceeds to step 568 where the setting of the appropriate switch of control switch circuit 124 is compared to the value MINUTES. If the switch setting is greater than MINUTES, system 100 remains off. Otherwise, system 100 is activated.

Likewise, at step 566, processor 110 determines whether system 100 is set to activate after dusk. If so, system 100 remains on. Otherwise, processor 110 proceeds to step 570 where the setting of the appropriate switch of control switch circuit 124 is compared to the value MINUTES. If the switch setting is less than or equal to MINUTES, system 100 remains on. Otherwise, system 100 is deactivated.

As described above, at step 554, processor 110 checks the SUNSENSOR signal at line 112 to determine whether the detected light is in the first state (i.e., night) or the second state (i.e., day). If a night state is detected, processor 110 proceeds to step 572 to determine if the value TIMEVALID is TRUE from flow diagram 450. If so, processor 110 detects at step 574 whether the "before dawn" flag is set. Depending on the flag at step 574, processor 110 proceeds to either step 576 or step 578. If the "before dawn" flag is set, processor 110 determines at step 576 whether system 100 is already turned on. If so, it remains on. If not, processor 110 proceeds to step 580.

Referring again to step 574, if the "before dawn" flag is not set, processor 110 determines at step 578 whether system 100 is presently inactive. If not, processor 110 proceeds to step 582. If system 100 is inactive, though, it remains off.

At step 580, processor 110 determines whether system 100 is set to activate after dawn and if it is, system 100 is turned off. Otherwise, processor 110 proceeds to step 584 where the setting of the appropriate switch of control switch circuit 124 is compared to the value MINUTES. If the switch setting is less than or equal to MINUTES, system 100 remains off. Otherwise, system 100 is activated.

Likewise, at step 582, processor 110 determines whether system 100 is set to deactivate before dusk. If so, system 100 is turned off. Otherwise, processor 110 proceeds to step 586 where the setting of the appropriate switch of control switch circuit 124 is compared to the value MINUTES. If the switch setting is greater than MINUTES, system 100 remains on. Otherwise, system 100 is deactivated.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of supplying water to plants comprising the steps of:
   detecting light adjacent the plants, said detected light having at least two levels of illumination corresponding to different states;
   generating a first signal representative of a first state when the level of illumination of the detected light is less than a threshold level;
   generating a second signal representative of a second state when the level of illumination of the detected light is greater than the threshold level;
   anticipating in response to the first and second signals approximately when the detected light will next change from the first state to the second state and approximately when the detected light will next change from the second state to the first state;
   generating an initiate signal and a terminate signal, said initiate signal being generated a first period of time before or after the anticipated change from the first state to the second state and said terminate signal being generated a second period of time before or after the anticipated change from the second state to the first state; and
   supplying water to the plants in a sequence of at least one on period and at least one off responsive to the initiate signal to begin the sequence and responsive to the terminate signal to end the sequence.

2. The method of claim 1 further comprising the steps of detecting a change from the first state to the second state in response to the first and second signals, respectively, and detecting a change from the second state to the first state in response to the second and first signals, respectively.

3. The method of claim 2 wherein the step of detecting a change from the second state to the first state includes detecting the change from the second state to the first state only after the first signal indicates that the level of illumination of the detected light has become less than the threshold level for longer than a first validation period and wherein the step of detecting a change from the first state to the second state includes detecting the change from the first state to the second state only after the second signal indicates that the level of illumination of the detected light has become greater than the threshold level for longer than a second validation period.

4. The method of claim 2 further comprising the steps of timing a first interval corresponding to the duration of a previous first state and timing a second interval corresponding to the duration of a previous second state.

5. The method of claim 4 further comprising the step of validating the detected change from the first state to the second state, or vice-versa, when the sum of the first and second timed intervals corresponding to consecutive previous first and second states is within a predetermined range of time.

6. The method of claim 4 wherein the step of determining the anticipated changes includes determining the anticipated change from the first state to the second state as a function of the first timed interval and determining the anticipated change from the second state to the first state as a function of the second timed interval.

7. The method of claim 6 further comprising the step of storing the first and second timed intervals corresponding to a predetermined number of previous first and second states, respectively, and wherein the step of determining the anticipated changes includes determining the anticipated change from the first state to the second state as a function of the average of the stored first timed intervals and determining the anticipated change from the second state to the first state as a function of the average of the stored second timed intervals.

8. The method of claim 1 wherein the step of anticipating the changes includes determining the anticipated change from the first state to the second state to be approximately 24 hours after a previous change from the first state to the second state and determining the anticipated change from the second state to the first state to be approximately 24 hours after a previous change from the second state to the first state.

9. The method of claim 1 further comprising the step of bypassing the step of detecting light whereby the initiate signal is generated at a first desired time and the terminate signal is generated at a second desired time.

10. Apparatus for controlling a watering system for supplying water to plants in a sequence of at least one on and off period and at least one off period, said watering system including at least one valve connected to a water supply, said apparatus comprising:
    a photodetector for detecting light adjacent the plants, said detected light having at least two levels of illumination corresponding to different states;
    a threshold circuit for generating a first signal representative of a first state when the level of illumination of the detected light is less than a threshold level and for generating a second signal representative of a second state when the level of illumination of the detected light is greater than the threshold level;
    a processor responsive to the first and second signals for anticipating approximately when the detected light will next change from the first state to the second state and approximately when the detected light will next change from the second state to the first state;
    a counter circuit responsive to the processor for generating an initiate signal and a terminate signal, said initiate signal being generated a first period of time before or after the anticipated change from the first state to the second state and said terminate signal being generated a second period of time before or after the anticipated change from the second state to the first state; and
    a valve control circuit responsive to the initiate signal to begin the sequence and responsive to the terminate signal to end the sequence.

11. A system for supplying water to plants comprising:
    a photodetector for detecting light adjacent the plants, said detected light having at least two levels of illumination corresponding to different states;
    a threshold circuit for generating a first signal representative of a first state when the level of illumination of the detected light is less than a threshold level and for generating a second signal representative of a second state when the level of illumination of the detected light is greater than the threshold level;

a processor responsive to the first and second signals for anticipating approximately when the detected light will next change from the first state to the second state and approximately when the detected light will next change from the second state to the first state;

a counter circuit responsive to the processor for generating an initiate signal and a terminate signal, said initiate signal being generated a first period of time before or after the anticipated change from the first state to the second state and said terminate signal being generated a second period of time before or after the anticipated change from the second state to the first state;

means, including a valve, for supplying water to the plants in a sequence of at least one on period and at least one off period; and a valve control circuit responsive to the initiate signal to begin the sequence and responsive to the terminate signal to end the sequence.

12. The system of claim 11 wherein the processor includes a state circuit responsive to the first and second signals, respectively, for detecting a change from the first state to the second state and responsive to the second and first signals, respectively, for detecting a change from the second state to the first state.

13. The system of claim 12 further comprising a timer for timing a first interval corresponding to the duration of a previous first state and for timing a second interval corresponding to the duration of a previous second state.

14. The system of claim 13 wherein the processor includes a validation circuit for validating the detected change from the first state to the second state, or vice-versa, when the sum of the first and second timed intervals corresponding to consecutive previous first and second states is within a predetermined range of time.

15. The system of claim 13 wherein the processor determines the anticipated change from the first state to the second state as a function of the first timed interval and determines the anticipated change from the second state to the first state as a function of the second timed interval.

16. The system of claim 15 further comprising a memory for storing the first and second timed intervals corresponding to a predetermined number of previous first and second states, respectively, and wherein the processor determines the anticipated change from the first state to the second state as a function of the average of the stored first timed intervals and determines the anticipated change from the second state to the first state as a function of the average of the stored second timed intervals.

17. The system of claim 12 wherein the state circuit detects the change from the second state to the first state only after the first signal indicates that the level of illumination of the detected light has become less than the threshold level for longer than a first validation period and detects the change from the first state to the second state only after the second signal indicates that the level of illumination of the detected light has become greater than the threshold level for longer than a second validation period.

18. The system of claim 11 further comprising a time-base circuit based on a 24-hour cycle wherein the processor is responsive to the time-base circuit so that the anticipated change from the first state to the second state is approximately 24 hours after a previous change from the first state to the second state and the anticipated change from the second state to the first state is approximately 24 hours after a previous change from the second state to the first state.

19. The system of claim 11 further comprising an override circuit for bypassing operation of the photodetector whereby the counter circuit generates the initiate signal at a first desired time and generates the terminate signal at a second desired time.

20. The system of claim 11 wherein the threshold level corresponds to a level of illumination generally corresponding to dawn and dusk.

* * * * *